United States Patent [19]

Koguchi

[11] Patent Number: 5,313,011
[45] Date of Patent: May 17, 1994

[54] APPARATUS FOR CARRYING OUT AUTOMATIC PLAY IN SYNCHRONISM WITH PLAYBACK OF DATA RECORDED ON RECORDING MEDIUM

[75] Inventor: Satoru Koguchi, Tokyo, Japan

[73] Assignee: Casio Computer Co., Ltd., Tokyo, Japan

[21] Appl. No.: 796,456

[22] Filed: Nov. 22, 1991

[30] Foreign Application Priority Data

Nov. 29, 1990 [JP] Japan ................................. 2-333233

[51] Int. Cl.⁵ .................................................. G10H 1/00
[52] U.S. Cl. .......................................................... 84/609
[58] Field of Search ..................................... 84/609–614, 84/634–638

[56] References Cited

U.S. PATENT DOCUMENTS

| | | |
|---|---|---|
| 4,419,918 | 12/1983 | Dyck et al. |
| 4,566,362 | 1/1986 | Kikumoto |
| 4,694,724 | 9/1987 | Kikumoto et al. |
| 4,969,384 | 11/1990 | Kawasaki et al. ............ 84/612 |
| 5,138,925 | 8/1992 | Koguchi et al. ............... 84/609 |
| 5,159,141 | 10/1992 | Iba .................................. 84/613 X |

*Primary Examiner*—Stanley J. Witkowski
*Attorney, Agent, or Firm*—Frishauf, Holtz, Goodman & Woodward

[57] ABSTRACT

When a playback speed of a recording medium such as a compact disc (CD) or the like is changed, the change of this playback speed is reflected in a clock which controls a tempo of automatic play. In the background of music reproduced from the recording medium, playing data provided during the play is written in a memory (211) in a real time fashion. When the automatic play is carried out in accordance with the content stored in the memory (211), the present invention includes a mode (A) in which the changed state of the playback speed of the CD and the tempo/musical sound pitch states of automatic play are automatically reproduced in the same states as those in the recording timing point, and a mode (B) in which the playback speed of the CD is automatically returned to the original speed before being changed and the tempo/musical sound pitch states of automatic play are automatically changed in response thereto.

29 Claims, 22 Drawing Sheets

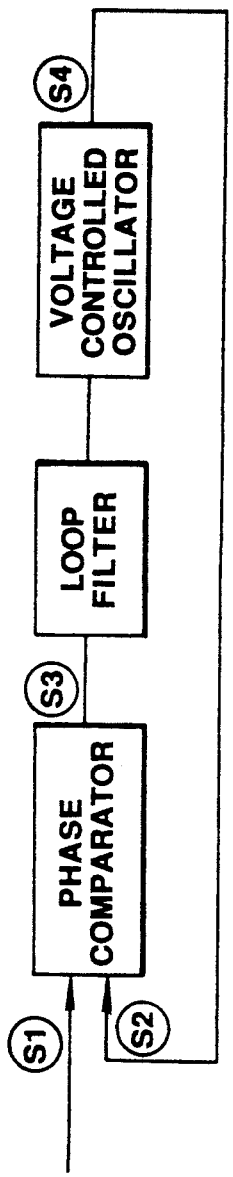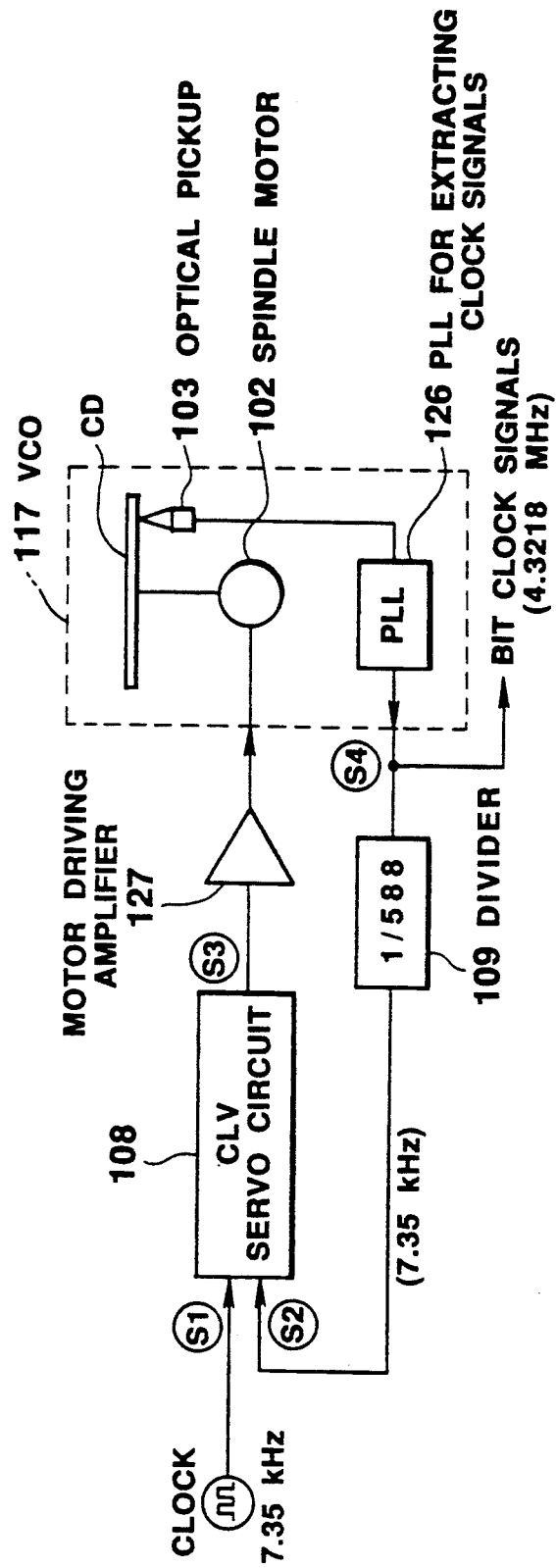
FIG.5A
FIG.5B

Q DATA

| Q1 | | | Q16 |
|---|---|---|---|
| FLAG | 0 0 0 1 ADDRESS | TRACK NUMBER TNO | |
| Q17 INDEX CODE | | RUNNING TIME DATA | P MIN (MINUTE) |
| Q33 RUNNING TIME DATA | P SEC (SECOND) | RUNNING TIME DATA | P FRAME (FRAME) |
| Q49 0 0 0 0 0 0 0 0 | | ABSOLTE TIME DATA | A MIN (MINUTE) |
| Q65 ABSOLTE TIME DATA | A SEC (SECOND) | ABSOLTE TIME DATA | A FRAME (FRAME) |
| Q81 ERROR-DETECTION CODE | | | Q96 |

|  | R | S | T | U | V | W |
|---|---|---|---|---|---|---|
| SYMBOL NO. 0 | 0 | 0 | 1 | 0 | 0 | 1 |
| 1 | INSTRUCTION ||||||
| 2 | PARITY Q0 ||||||
| 3 | PARITY Q1 ||||||
| 4 | GRAPHICS DATA ||||||
| ⋮ | ||||||
| 19 | ||||||
| 20 | PARITY P0 ||||||
| 21 | PARITY P1 ||||||
| 22 | PARITY P2 ||||||
| 23 | PARITY P3 ||||||

24 SYMBOLS

FIG. 21

APPARATUS FOR CARRYING OUT AUTOMATIC PLAY IN SYNCHRONISM WITH PLAYBACK OF DATA RECORDED ON RECORDING MEDIUM

BACKGROUND OF THE INVENTION

1. Field of the Invention

The present invention relates to an apparatus for enabling electronic musical instruments to carry out automatic play in synchronism with the playback of data such as audio data, graphics data recorded on a compact disc (CD) or the like.

2. Description of the Prior Art

It is known that, if a recording medium recorded in a so-called minus-one system (i.e., system in which a piano concerto is recorded except for the part of piano) is reproduced by operating a compact disc player, an analog disc player, a digital audio tape recorder or the like and if the player plays an musical instrument in the background of reproduced sound of this audio data, then a rich reality can be obtained and also the playing timing can be understood, which is very useful in musical training for beginners.

In order to reproduce the above-mentioned playing state by using automatic play, audio data is initially reproduced from the recording medium. Then, the player carries out the musical play by using an electronic musical instrument in synchronism with the reproduced sound of audio data in actual practice. At that time, musical play data is recorded in a sequencer in a real time fashion. After the above-mentioned operation and processing, the audio data is reproduced from the recording medium in synchronism with the playback of the automatic play by the sequencer.

However, the above-mentioned system in which automatic playing data is input in a real time fashion is difficult for the beginner. That is, the beginner cannot control the musical play speed to coincide with the playback speed of the audio data reproduced in the background.

To remove this disadvantage, the audio playback speed is decreased by adjusting the driving state of the recording medium by the user. If the user sets the speed (tempo) suitable for the musical play and inputs the automatic playing data in a real time fashion, then the problem of the speed (tempo) can be solved.

This method, however, cannot solve the following problems.

That is, if the playback speed of the audio data is changed, then the interval (pitch) of the reproduced sound of audio data also is changed accordingly. To remove this problem, a circuit for manually returning the interval of the audio reproduced sound to the original one must be additionally provided or the tuning of the musical sound pitch of the electronic musical instrument must be carried out one more time in unison with the interval of the reproduced sound of the audio data, which is very complex.

Further, if the synchronizing playback is carried out after the user recorded the automatic playing data in the sequencer, then the user must remember the audio playback speed adjusted in the recording mode and the adjusted value in the tuning of the electronic musical instrument. In other words, unless upon playback the user sets again the system setting data such as the audio playback speed and the adjusted value in the tuning of the electronic musical instrument to the same state as those in the recording timing point, then the playback speed of the recording medium and the playback tempo of the automatic play and the interval of the audio reproduced sound and the interval of the reproduced sound of the automatic play do not coincide with each other, whereby the audio playback and the automatic play are disharmonized.

This is also true for the case when the automatic play is carried out in synchronism with the playback of an image. For example, if a landscape and a score are displayed as image data and automatic playing data is recorded in synchronism with the display of the displayed image, then the playback speed of the image and the playback tempo of the automatic play must be synchronized with each other during the playback of the automatic playing data, otherwise the automatic play and the display of the score will not become coincident with each other.

OBJECTS AND SUMMARY OF THE INVENTION

Accordingly, it is an object of the present invention to provide an apparatus or method in which, if the playback speeds of data such as audio data and image data are changed and automatic playing data is input and if the input automatic playing data and the data such as audio and image data are played back during the synchronizing playback mode, the synchronizing playback can be effected without a cumbersome operation such as setting switches or the like by the user under the condition such that the two playback speeds and the two intervals are reliably made coincident with each other.

As an aspect of the present invention, an apparatus for carrying the reproduction of performance data in synchronism with the reproduction of automatic playing data by using a recording medium in which performance data is recorded is comprised of a reproducing circuit for playing the recording medium to reproduce the performance data, a storing circuit for storing a series of automatic playing data which is reproduced in synchronism with the performance data stored in the recording medium, an automatic playing circuit coupled to the storing circuit for reading the automatic playing data from the storing circuit to sequentially generate corresponding musical sound signals to thereby execute automatic play, a setting circuit for setting reproducing speed data used when the performance data and the automatic playing data are reproduced in synchronism with each other, a control circuit coupled to the reproducing circuit, the automatic playing circuit and the setting circuit for controlling the reproduced condition of the performance data and the automatic playing data and including a circuit for controlling a playing speed of the recording medium so that the performance data is reproduced at a set speed corresponding to the speed data set by the setting circuit, and including a circuit for controlling a read-out speed of the automatic playing data from the storing circuit such that the automatic playing data is reproduced at a set speed corresponding to speed data set by the setting circuit.

With the above-mentioned arrangement, if the playback speeds of the audio data and image data are changed and the automatic playing data are input, then control data associated with the changed values of the playback speeds of the audio and image data are stored in the automatic playing memory. Accordingly, when the automatic playing data and the audio and image data are reproduced during the synchronizing playback mode, if the audio and image data and/or automatic play are controlled on the basis of the control data, then without performing a cumbersome operation such as setting the switches by the user, the synchronizing playback can be carried out under the condition such that the two playback speeds and the two intervals are more reliably made coincident with each other.

Brief Description of the Drawings

A better understanding of the objects, features, and advantages of the invention can be gained from a consideration of the following detailed description of the preferred embodiments thereof, in conjunction with the figures of the accompanying drawings, wherein:

FIG. 5A shows a block diagram of a fundamental circuit arrangement of a PLL circuit of the present invention;

FIG. 5B shows a block diagram of a CLV servo circuit of the present invention;

FIG. 21 is a diagram showing a pack format of graphics mode of the CD;

DETAILED DESCRIPTION

In the first embodiment, the present invention is applied to an electronic keyboard musical instrument having a CD playback function and automatic playing function. In the system of the first embodiment, the playback speed of CD can be varied and a pitch of musical instrument playing sound also is automatically controlled in unison with the interval of the CD reproduced sound which is changed in response to the playback speed of the CD. When the played content of the musical instrument at that time is stored in a memory as automatic playing data and the automatic play is executed in response to the content stored in the memory, this electronic keyboard musical instrument includes a mode A in which the changed state of the playback speed of the CD and the tempo/musical sound pitch state of automatic play are automatically reproduced in the same state as that stored in the memory and a mode B in which the playback speed of the CD is automatically returned to the original speed before being changed and the automatic playing tempo/musical sound pitch are automatically changed in response thereto.

AN OVERALL ARRANGEMENT OF THE SYSTEM ACCORDING TO THE FIRST EMBODIMENT

Figure 1:
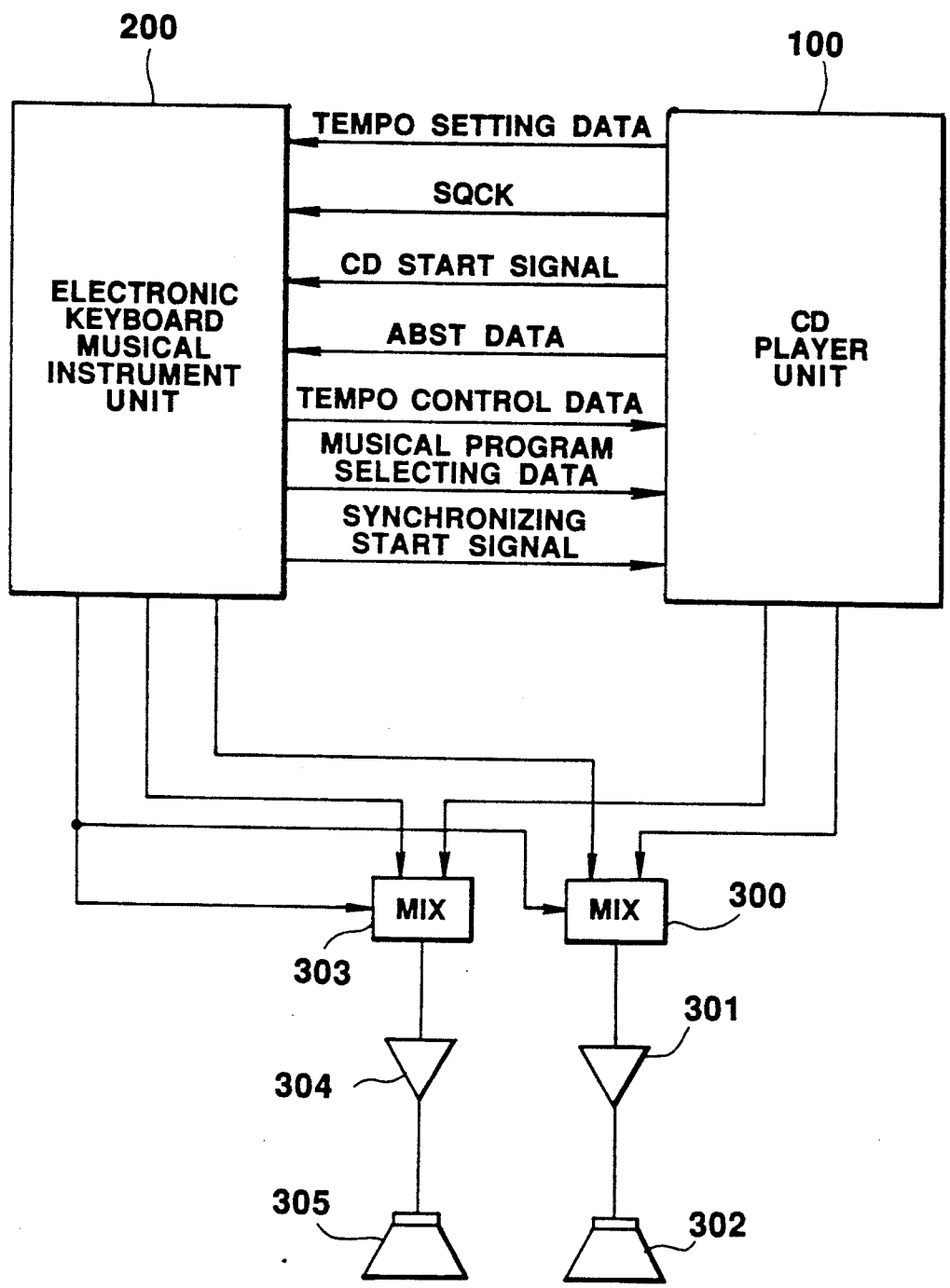
FIG. 1 shows in block form an overall arrangement of the apparatus according to a first embodiment of the present invention.

FIG. 1 shows an overall arrangement of the system according to the first embodiment of the present invention.

Referring to FIG. 1, it will be seen that this system is mainly composed of a CD player unit 100 and an electronic keyboard musical instrument unit 200. The CD player unit 100 derives audio signals of L (left) and R (right) channels reproduced from the CD. The electronic keyboard musical instrument unit 200 converts a musical sound signal corresponding to the operation of the keyboard and a musical sound signal corresponding to automatic playing data into the signals of L/R channels and outputs the same. Further, the electronic keyboard musical instrument unit 200 derives a rhythm signal and an automatic musical accompaniment signal as the same signal in the left and right channels. The right channel outputs of the two units 100 and 200 are mixed by a mixer 300, amplified by an amplifier 301 and then emanated from a speaker 302. In a like manner, the left channel outputs thereof are mixed by a mixer 303, amplified by an amplifier 304 and then emanated from a speaker 305.

The CD player unit 100 supplies the electronic keyboard musical instrument unit 200 with tempo setting data, SQCK (sequencer clock), a CD start signal and ABST (absolute time) data, whereas the electronic keyboard musical instrument unit 200 supplies the CD player unit 100 with tempo control data, music selection data and a synchronizing (sync.) start signal.

The tempo setting data is data corresponding with a set value of a playback speed of the CD.

The SQCK (sequencer clock) is a clock signal having a frequency corresponding to the value of the tempo setting data and whose frequency changes with the change of the tempo setting data. This SQCK is used to control an event time constructing the automatic playing data.

The CD start signal is output from the CD player unit 100 when the playback of the CD is started. This CD start signal is used to control the writable condition of the automatic playing data.

The ABST (absolute time) data indicates an absolute time of CD in the playback mode and results from reproducing the subcode of the CD. This ABST data is used to select musical programs of the CD or the like.

The tempo control data is stored in an automatic playing memory and corresponds with tempo setting data provided at a timing point in which the writing of the automatic playing data is started.

The musical program selection data is stored in the automatic playing memory and corresponds with ABST data of the CD at a timing point in which the writing of the automatic playing data is started.

The sync. start signal is output from the electronic keyboard musical instrument unit 200 at a timing point in which the synchronizing playback of the CD and the automatic play is started.

A STRUCTURE OF THE CD PLAYER UNIT 100

Figure 8:
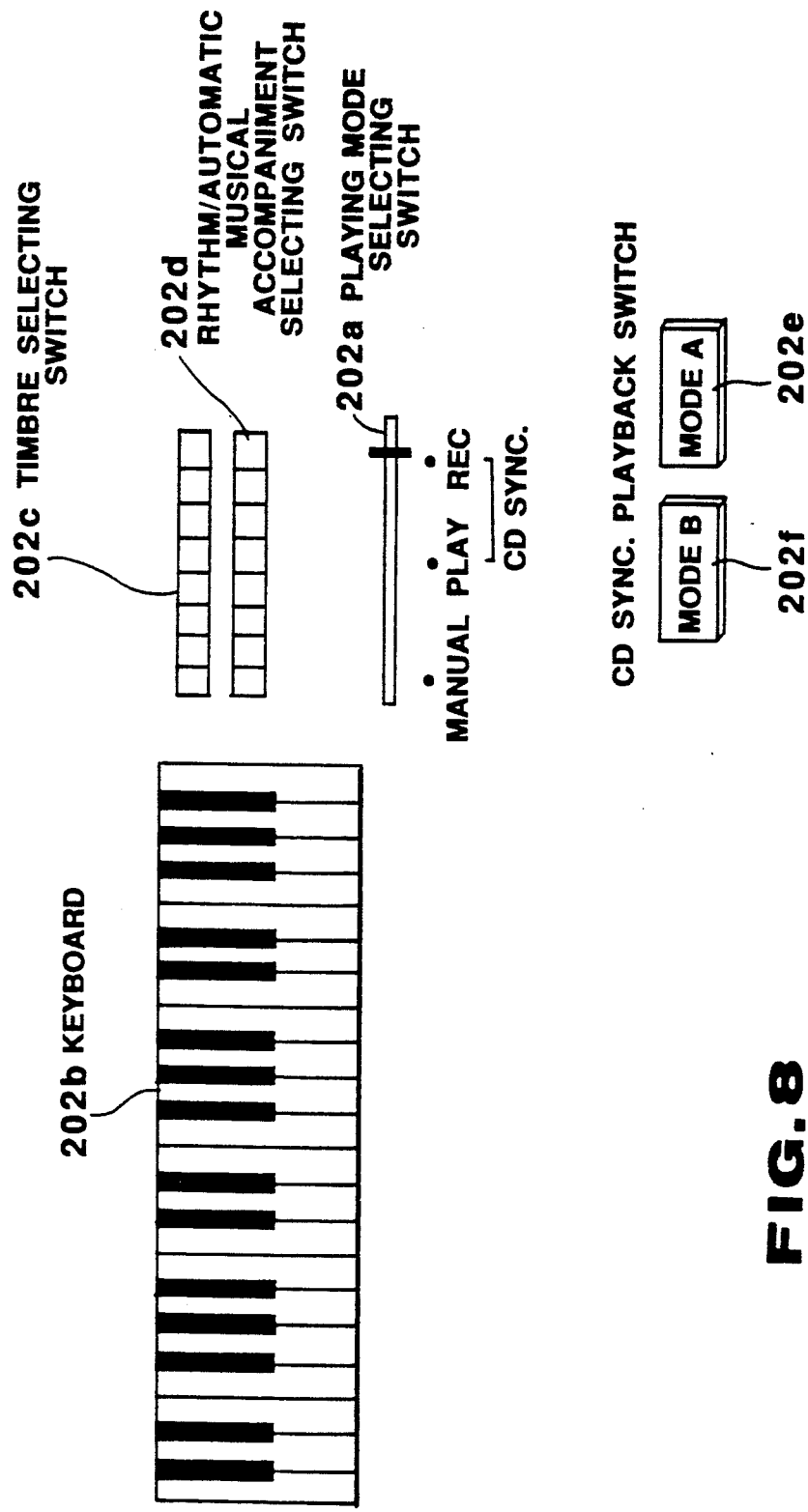
FIG. 8 shows in detail a musical instrument operation unit of the present invention.

The arrangement of the CD player unit 100 will be described with reference to FIGS. 2 and 8.

Figure 2:
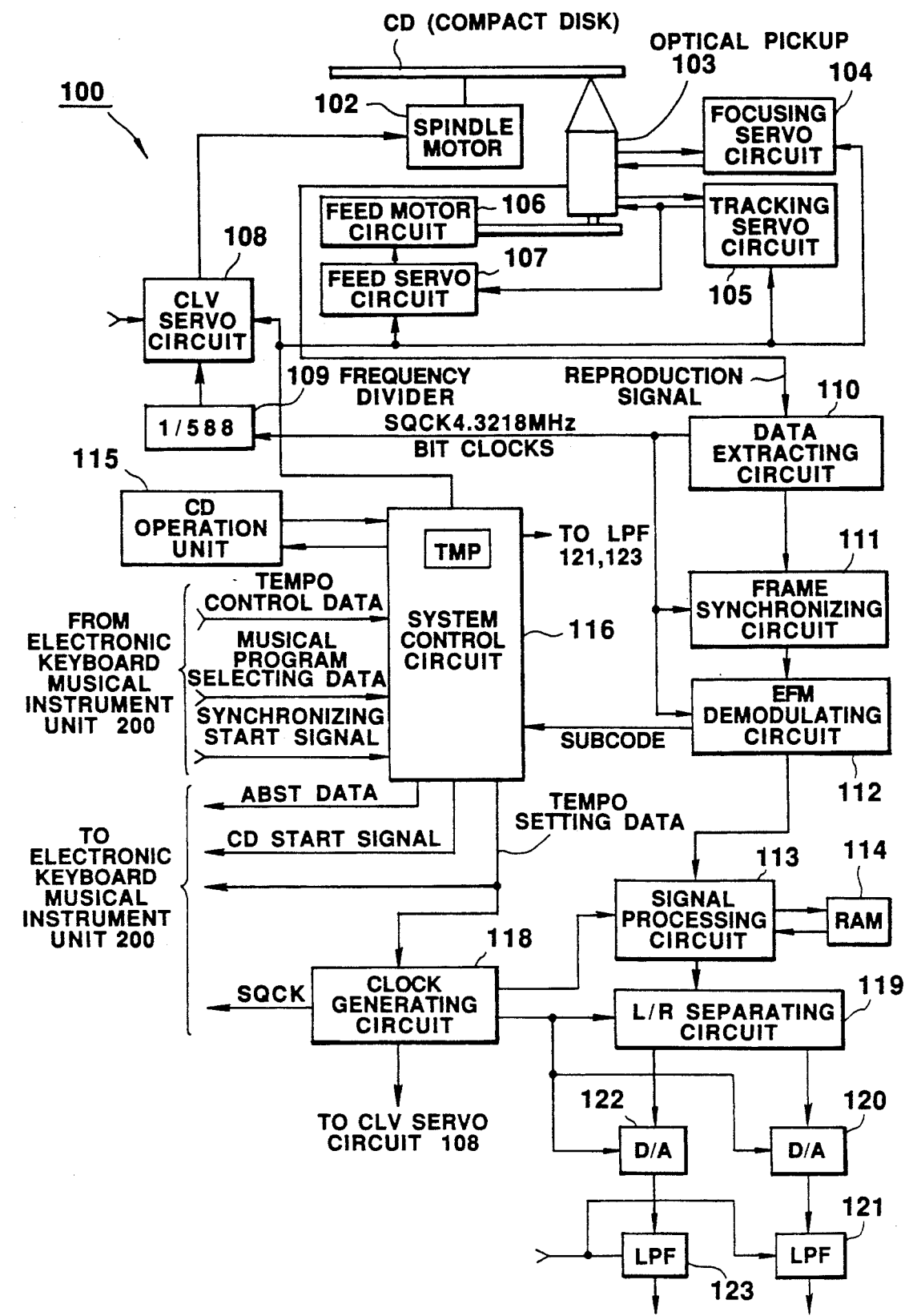
FIG. 2 shows in block form a CD player unit used in the present invention.

The CD player unit 100 includes respective circuits shown in a block diagram of FIG. 2, wherein the CD is loaded on a disc holder (not shown) and then the CD is played back by operating predetermined switches in a CD operation unit 115.

Figure 3:
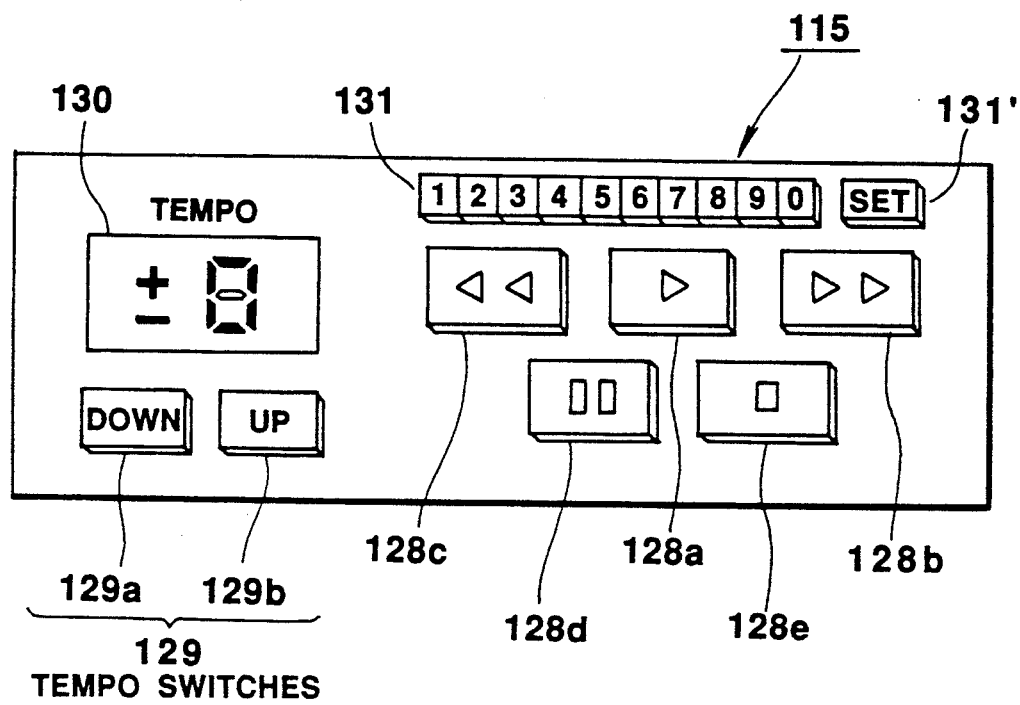
FIG. 3 shows a CD operation panel of the CD player unit shown in FIG. 2.

The CD operation unit 115 includes a variety of switches and a display panel shown in FIG. 3. More specifically, the CD operation unit 15 includes a play switch 128a which is operated to play back the CD, a fast forward switch 128b which is operated to fast-forward the playback position of the CD, a fast-backward switch 128c which is operated to fast-backward the playback position of the CD, a pause switch 128d which is operated to pause the playback of the CD, and a stop switch 128e which is operated to stop the playing state of the CD. Further, the CD operation unit 115 includes a numeral switch 131 by which the user can input the serial number of musical program reproduced from the CD and a set switch 131' which is used to determine the input musical program number. If the user wants to reproduce, for example, the fifth musical program of the CD, then the user must input [5], [SET] and press the play switch 128a. Furthermore, the CD operation unit 115 includes an up-switch 129a and a down-switch 129b which are operated to change the playback speed of the CD. If the user depresses the up-switch 129a once, then the playback speed of the CD is increased by one step. If the user depresses the down-switch 129b once, then the playback speed of the CD is decreased by one step.

If the playback speed of the CD is changed, then the read-out speed of recorded data from the CD is changed so that a processing speed at which this data is converted into the audio signal also is changed accordingly, thereby the frequency of the reproduced audio signal being changed from the original one. That is, a musical interval (pitch) is changed. In this system, the changing step of the playback speed of the CD is set in such a manner that the pitch is changed in the units of semitone. The changing step of the playback speed of the CD ranges from [+9] to [−9] around [0], and the pitch width of the reproduced audio signal is changed from [+9] to [−9] in the units of semitone. [0] represents the original speed and pitch, and the changing step is initially set to [0] when this system is powered. This speed changing step is displayed on the display panel 130.

The tempo setting data generated by the operation of these tempo switches are sent to the electronic keyboard musical instrument unit 200 and reflected on the player of the electronic keyboard musical instrument, whereby the sound level of the generated musical sound is automatically adjusted in the units of semitone in response to the change of the pitch in the CD.

Referring back to FIG. 2, a system control circuit 116 is, for example, a microprocessor and is used to control the entirety of the CD player unit 100. When the CD is played, the system control circuit 116 supplies drive control signals to a constant linear velocity (CLV) servo circuit 108, a focusing servo circuit 104, a feed servo circuit 107 and a tracking servo circuit 105.

The CLV servo circuit 108 will be described more in detail later because it is deeply related to the present invention. The CLV servo circuit 108 is adapted to control the revolution rate of a spindle motor 102 which rotates the CD so that the linear velocity of each track of the CD becomes constant.

The focusing servo circuit 104 detects a focusing error from the state of the reflected-back light of the laser beam and controls an objective lens (not shown) within an optical pickup 103 on the basis of the focusing error in such a fashion that the objective lens is moved in the optical axis direction. The feed servo circuit 107 controls a feed motor 106 so as to move the optical pickup 103 in the radial direction of the compact disc while detecting the displacement of the laser beam relative to the center of the track of the CD. Further, to cope with the quick movement due to the deviation of the compact disc or the like, the tracking servo circuit 105 servo-controls the optical pickup 103 itself to follow the track.

As described above, by the feed servo circuit 107 and the tracking servo circuit 105, the laser beam radiated from the optical pickup 103 can be accurately radiated on the center of the track of the CD.

Protrusions, which might be called pits, are formed on the CD at its lower surface radiated by the laser beam, thereby the digital signal being recorded. The optical pickup 103 detects the existence of the pits on the basis of the quantity of light of reflected light of the laser beam radiated on the lower surface of the CD, and reads out the digital signal corresponding to the existence of and length of the pit. The thus read-out signal is supplied to a data extracting circuit 110 as a reproduced signal.

Figure 4:
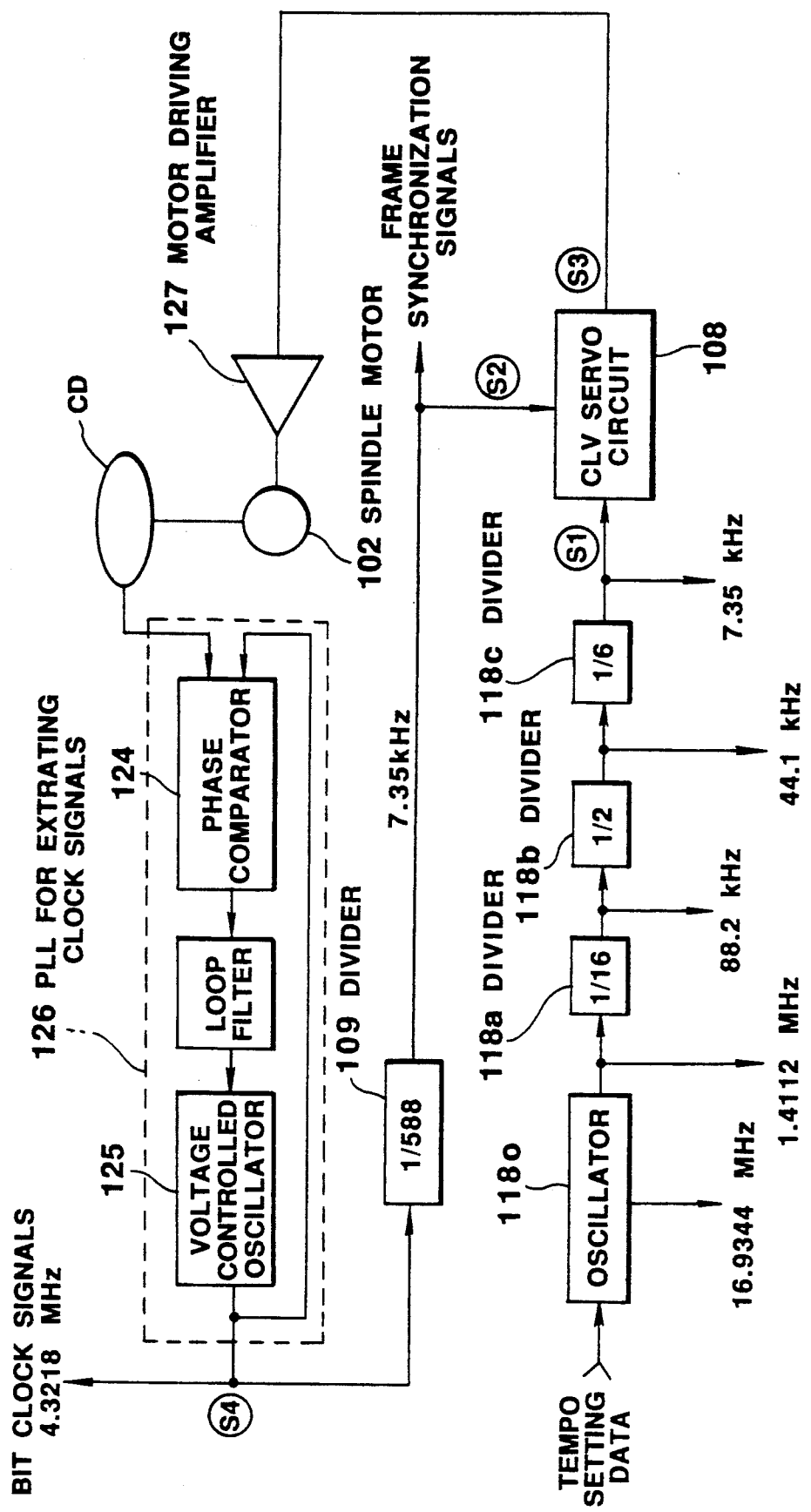
FIG. 4 is a schematic block diagram to which reference will be made in explaining CLV servo operation and clock signals in the CD player unit.

This reproduced signal is a kind of pulse train whose pulse duration changes from 3 to 11 in length. As a consequence, in a differentiated waveform of this pulse, the cycle thereof is not constant and therefore the bit clock of constant cycle is needed in order to extract data from the signal of the pulse train. To this end, by using a clock extracting PLL (phase locked loop), which will be described with reference to FIG. 4, provided within the data extracting circuit 110, the above-mentioned differentiated waveform is converted into a consecutive pulse train and thereby a bit clock is extracted. The clock extracting PLL 126 shown in FIG. 4 is comprised of a phase comparator 124, a voltage controlled oscillator (VCO) 125 and a loop filter.

The frame format of the CD, particularly highlighting the main portion relating to this embodiment, will be described below.

Figure 6:
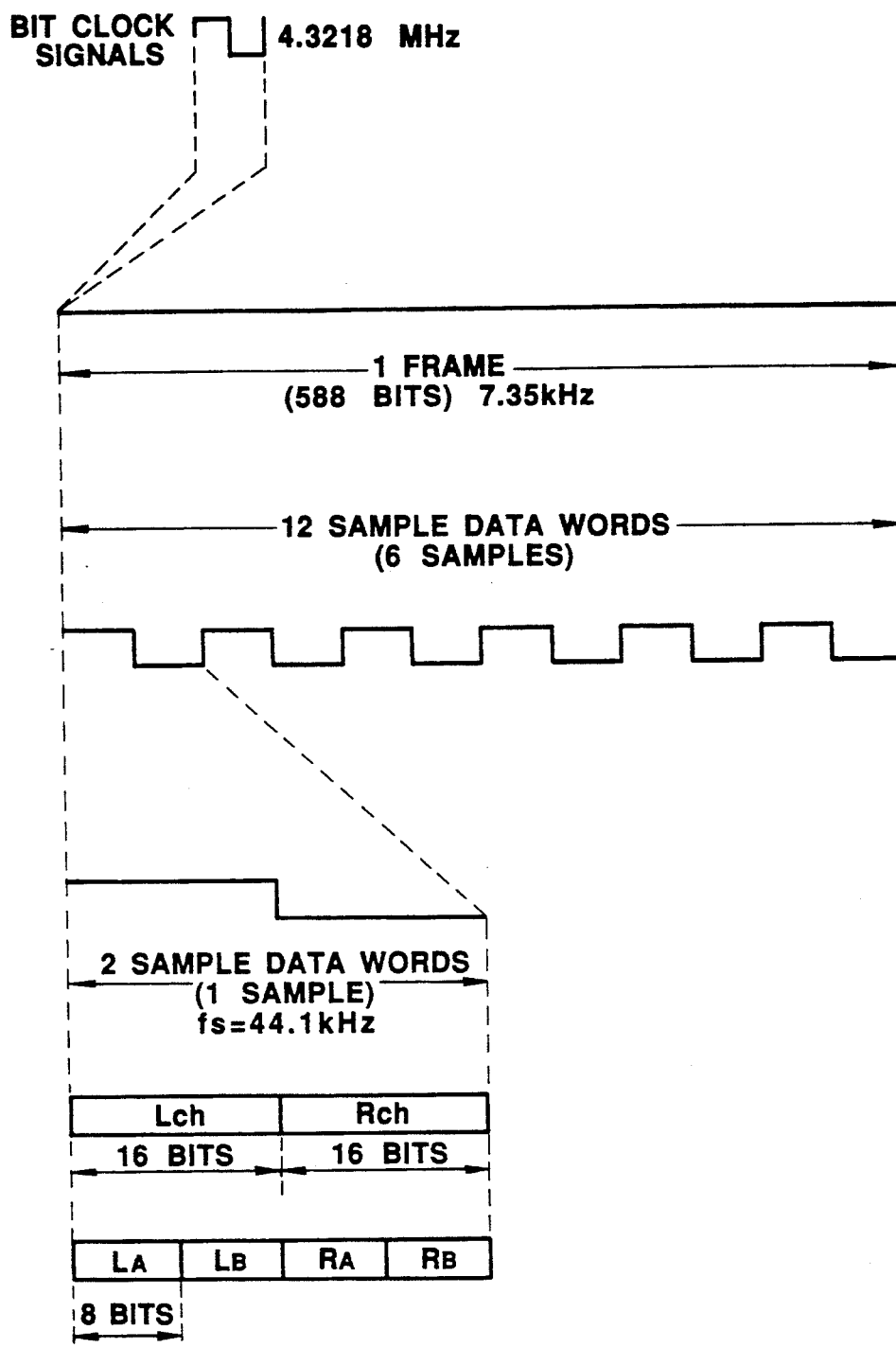
FIG. 6 shows a schematic diagram of frequency allocation of recording and reproduced signals of the CD.

As shown in FIG. 6, one frame of the signal of CD is formed of data of 588 bits and a starting portion of 24 bits on each frame is allocated to a frame sync. signal. Further, since 6 samples (12 sample data words) of L (left) and R (right) channels are involved in one frame, a time of one frame is represented as $1/fs \times 6$ (sec) where fs is the sampling frequency. The frequency of one frame is 7.35 kHz. The data of 588 bits is involved in one frame as described above, and calculating the bit clock in the reproduced signal from the CD, we have:

$$7.35 \text{ kHz} \times 588 = 4.3218 \text{ MHz}$$

This bit clock is employed in the normal speed mode where the tempo control operation, which will be described later, is not effected.

Referring back to FIG. 2, the data extracting circuit 110 extracts the above-mentioned bit clock from the reproduced signal and supplies the thus extracted bit clock to a frequency divider109, a frame synchronizing circuit 111 and an eight to fourteen modulation (EFM) demodulating circuit 112 and a signal processing circuit 113. Further, the data extracting circuit 110 converts the reproduced signal into binary value data by using the bit clock and supplies this binary value data to the frame synchronizing circuit 111 as reproduced data. The frame synchronizing circuit 111 detects a frame sync. signal involved in the input reproduced data. Further, the frame synchronizing circuit 111 partitions reproduced data in the units of frame by using the detected frame sync. signal and supplies the same to the EFM demodulating circuit 112. The EFM demodulating circuit 112 demodulates 14-bit digital data (subcode, audio data or the like) within each frame modulated according to the EFM-modulation system, which will be described later, to provide 8-bit data.

Now, it is not clear what probability logic [1]and logic [0] of each bit of digital data occur. When the optical pickup 103 of FIG. 2 detects digital data from the pit formed on the CD as an electrical signal, if the logic [1] or the logic [0] continues longer than the other, then a DC component occurs and the bit interval information is interrupted, which causes a malfunction to occur in the focusing servo circuit 104 which performs the servo-control operation on the basis of the output of the optical pickup 103 and in other servo circuit.

For this reason, in order to remove such DC component as much as possible, the 8-bit digital data is converted into the 14-bit data series in which the logic [1] or the logic [0] is not continued long, and then recorded on the CD. This data conversion system is what might be called the EFM-modulation system. As described above, in the EFM demodulating circuit 112 of FIG. 2, 14-bit data of the reproduced signal is converted into the original 8-bit data.

Of the data thus EFM-demodulated, the audio data is input to the signal processing circuit 113 and the subcode is input to the system control circuit 116. The subcode includes a variety of data such as musical program number data, absolute time data and so on, and the system control circuit 116 detects these data involved in the subcode and uses the same to perform the selection control of the musical program or the like. Incidentally, the absolute time data is data which gradually increments from the recording start position 0 of the CD so that an arbitrary position on the CD can be selected by designating the absolute time data to control the playback position of the CD.

The signal processing circuit 113 sequentially writes input audio data in a random access memory (RAM) 114 and corrects error on the basis of an error correction code which is what might be called a Cross Interleave Reed-Solomon code (CIRC). Also, the signal processing circuit 113 de-interleaves the input audio data to restore each sample of digital audio data of 16 bits in the units of frame. In addition, the RAM 114 also is served as a buffer circuit that is used to correct the time base fluctuated by the influence of rotational jitter component of the motor. The signal processing circuit 113 is supplied with a clock signal from a clock generating circuit 118 and executes the above-mentioned processings in response to the clock signal supplied thereto.

Then, each sample of the digital audio data of 16 bits is separated into L/R stereo audio data by an L/R separating circuit 119. These L/R stereo audio data are respectively converted into analog audio signals by digital-to-analog (D/A) converters 120, 122, and output from low-pass filters (LPFs) 121, 123 as analog audio data.

As FIG. 4 shows, the clock generating circuit 118 includes frequency dividers 118a, 118b and 118c which sequentially divide an oscillation frequency of an oscillator 118o by integers. In FIG. 4, clocks of 88.2 kHz and 44.1 kHz are employed as read-in clocks for separating L/R channels and D/A conversion, whereas the clock of 7.35 kHz is employed as a servo clock of the CLV servo control. Other oscillation frequency, 16.9344 kHz of the oscillator 118o and other timing signals (not shown) are employed as control clocks of large scale integrated (LSI) circuits constructing the respective circuits of FIG. 2. Other oscillation frequency, 192 Hz of the oscillator 118o is output to the electronic keyboard musical instrument unit 200 as the SQCK (sequencer clock). The above-mentioned frequencies are changed in response to a tempo control signal which will be referred to later.

The CLV servo control will be described below.

This CLV servo control is fundamentally based on the PLL system.

FIG. 5A is a schematic block diagram showing a fundamental circuit of the PLL, wherein a phase error voltage detected by a phase comparator is fed through a loop filter and a VCO back to the phase comparator.

If the CLV servo system of FIG. 4 is represented in the form of the PLL of FIG. 5A, then this CLV servo system is represented as FIG. 5B (loop filter is not shown). Reference numerals S1,S2,S3,S4 of FIG. 5B correspond with the same numerals in FIGS. 5A and 4. The CLV servo circuit 108 in FIG. 4 corresponds with the phase comparator in the PLL shown in FIG. 5A, and the spindle motor 102, the CD 101, the optical pickup 103 and the clock extracting PLL 126 within a broken-line block 117 is served as the VCO in this embodiment. Accordingly, by changing the output voltage of a motor driving amplifier 127, the revolution rate of the spindle motor 102 is varied to control the frequency of the signal pulse reproduced from the CD 101. As described above, the clock pulse in the input S2 of the CLV servo circuit 108 is completely locked by the clock (frequency: 7.35 kHz) of the input 1. At that very moment, in the input S4 of the frequency divider 109, a signal whose frequency is expressed as:

$$7.35 \text{ kHz} \times 588 = 4.3218 \text{ MHz}$$

is obtained. This signal is the bit clock whose accuracy and stability are substantially the same as those of a reference frequency of a quartz oscillator. At that time, the linear velocity at which each track of the CD is played back is constantly maintained constant.

One of the most specific features of the present invention, i.e., control operation in which audio tempo is varied by varying the playback speed of the CD will be described below.

In general, the lock range of the PLL lies in a range of about several percents of the input frequency of the phase comparator. Accordingly, if the input frequency of the phase comparator is varied, the an output frequency of the PLL can be varied arbitrarily under the condition such that the PLL is locked.

More specifically, during the CD is servo-controlled in a CLV fashion by the PLL, if the clock frequency of the input S1 (FIGS. 5A, 5B and 4) of the phase comparator in the PLL is varied, then the playback speed of the CD can be freely adjusted in a predetermined range while maintaining the locked condition of the PLL.

The clock frequency, 7.35 kHz supplied to the CLV servo circuit 108 (corresponding to the phase comparator of FIG. 5A) of FIG. 4 is used in the normal speed playback mode of the CD. If this clock frequency, 7.35 kHz is varied, then owing to the CLV servo control, the normal playback speed is varied to a playback speed proportional to the thus changed frequency, that is, the tempo is varied and the pitch of the reproduced sound also is changed.

In accordance with this embodiment, each time the tempo control button shown in the detailed diagram (FIG. 3) of the operation front panel of the CD operation unit 115 is depressed, the system control circuit 116 outputs the tempo setting data to change the frequency of the clock generating circuit 118 by semitone, i.e., by the ratio of $2^{1/12} = 1,059$, whereby the pitch and tempo of the reproduced sound of the CD are changed with the above-mentioned ratio. In order to increase/decrease the tempo and the pitch of the reproduced sound of the CD, the up-switch 129a and the down-switch 129b of the tempo control button 129 (see FIG. 3) must be selectively operated. In this case, if the oscillator 118o of FIG. 4 is composed of a ceramic oscillator whose oscillation frequency can be varied or of a programmable quarts oscillator and if this oscillator is controlled by the tempo control signal, then the above-mentioned frequency of the clock generating circuit 118 can be varied.

As described above, by varying the frequency of the clock generating circuit 118, the frequency of the bit clock also is changed with the same ratio with the result that the clock to the signal processing circuit 113, the sampling frequencies of the D/A converters 120, 122, the clock frequency for L/R separation, the cut-off frequencies of the low-pass filters 121, 123, clocks of various kinds of LSIs, the frequency of the frame sync. signal and the sequencer clock (SQCK) are simultaneously varied with the same ratio, $2^{1/12}$.

As described above, if the playback speed of the CD is varied, the pitch of the reproduced sound of the CD also is varied accordingly.

THE ARRANGEMENT OF THE ELECTRONIC KEYBOARD MUSICAL INSTRUMENT UNIT 220

The arrangement of the electronic keyboard musical instrument unit 220 will be described with reference to FIGS. 7 and 8.

Figure 7:
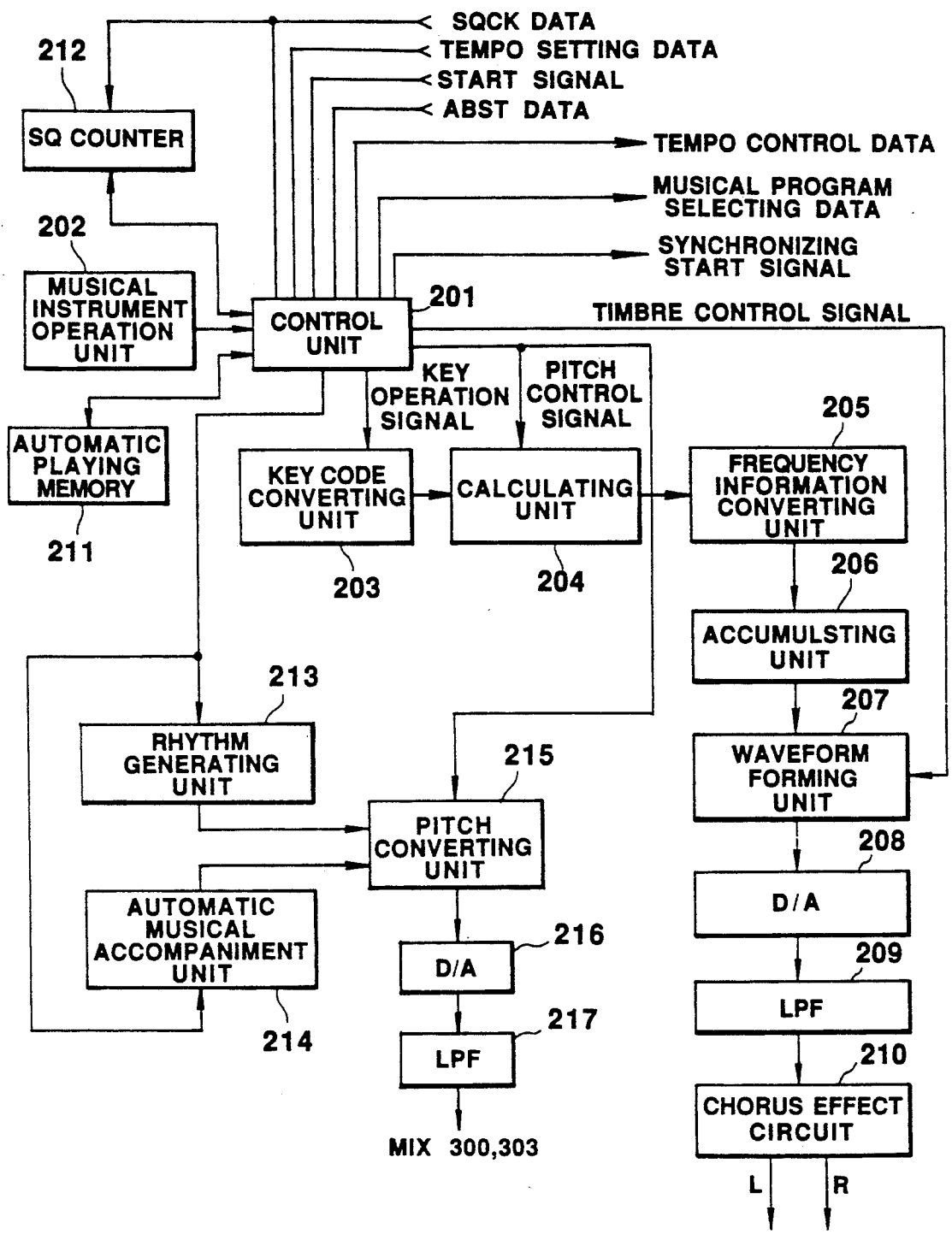
FIG. 7 shows a block diagram of an electronic musical keyboard instrument unit.

The electronic keyboard musical instrument unit 200 includes respective circuits shown in a block diagram forming FIG. 7 and generates a musical sound signal based on a manual play or on an automatic play. These playing informations are input by operating a musical instrument operation unit 202. The musical instrument operation unit 202 includes a playing mode selecting switch 202a, a keyboard 202b, a timbre selecting switch 202c, a rhythm/automatic musical accompaniment selecting switch 202d and CD synchronizing playback switches 202e and 202f as shown in FIG. 8.

The playing mode selecting switch 202a is used to select respective modes, such as [synchronizing recording mode] which is designated when automatic playing data is recorded in synchronism with the playback of the CD, [synchronizing playback mode] which is designated when automatic playing data is reproduced in synchronism with the playback of the CD and [manual playing mode] which is designated to when the ordinary play not the automatic play is carried out. The keyboard 202b comprises white keys and black keys of a plurality of octaves.

The timbre selecting switch 202c is used to select the timbre of the played sound.

The rhythm/automatic musical accompaniment selecting switch 202d is used to select a desired combination of rhythm and automatic musical accompaniment. If this switch 202d is operated, then rhythm sound such as sound of drums and sound of cymbals is generated at a predetermined rhythm pattern and the automatic musical accompaniment pattern corresponding to the operation of the keyboard 202b is selected, whereby an automatic musical accompaniment sound is generated.

The CD synchronizing playback switch comprises the mode A switch 202e for designating the mode A and the mode B switch 202f for designating the mode B. The mode A is the CD synchronizing reproducing mode in which the varied state of the playback speed of the CD and the tempo/musical sound pitch state of the automatic play are automatically reproduced in the same states as those stored in the memory and the automatic play is carried out, while the mode B is the CD synchronizing playback mode in which the playback speed of the CD is automatically returned to the original playback speed before and the automatic playing tempo/musical sound pitch is automatically varied for effecting the automatic play.

Referring back to FIG. 7, the control unit 201 includes a pushed key detecting/generated sound allocating circuit and scans the musical instrument operation unit 202 at a constant cycle to read pushed key and released key information of each key of the keyboard 202b within the musical instrument operation unit 202. If the key is pushed, then the control unit 201 allocates the pushed key to any one of a plurality of sound generating allocating channels, and also transmits the operated signal of that key to a key code converting unit 203. In the key code converting unit 203, the key operated signal is converted into a key code which specifies the pushed key, and the key code thus converted is input to a calculating unit 204.

This key code comprises an octave code and a note code. The octave code is a code which represents the name of octave to which the pressed key belongs. For example, C2 to B2 keys are represented as 000, C3 to B3 keys are represented as 001 and C4 to B4 keys are represented as 010 in a binary fashion. Further, the note code is a code corresponding to 12 sounds within one octave and C sound is expressed as 0000, C# sound is expressed as 0001 . . . B sound is expressed as 1011 in a binary fashion.

In FIG. 7, unless the player depresses the tempo switch 129 (see FIG. 3), then the above-mentioned key code is not calculated by the calculating unit 204 and input to a frequency information converting unit 205 from which there is derived a frequency number associated with the pitch corresponding to the key code. Thereafter, that frequency number is repeatedly accumulated at a predetermined cycle and the accumulated value, which changes at speed corresponding to the key number is output to a waveform forming unit 207. Then, by using this accumulated value as an address of the waveform forming unit 207 which is, for example, a waveform memory, musical sound waveform data is read out from the waveform forming unit 207. If the player operates the timbre selecting switch 202c to select the timbre of the musical instrument for the play, then the control unit 201 supplies a timbre control signal to the waveform forming unit 207 from which there is derived waveform data corresponding to the timbre selecting switch 202c.

The waveform thus read-out becomes a musical sound signal the pitch of which corresponds to the key code of the pressed key. Then, this musical sound signal is converted into an analog signal by a D/A converter 208, shaped in waveform by a low-pass filter (LPF) 209 and then separated into musical sound signals of two channels (L and R channels) having pseudo stereo effect by a chorus effect circuit 210.

Further, when the rhythm and automatic musical accompaniment are selected by the rhythm/automatic musical accompaniment selecting switch 202d, the control unit 201 outputs a rhythm classification designating signal and a rhythm clock to a rhythm generating unit 213 and also outputs a key operation signal and a musical accompaniment clock to an automatic musical accompaniment unit 214. The rhythm generating unit 213 derives rhythm sound data of the rhythm pattern designated by the rhythm classification designating signal in synchronism with the rhythm clock. The automatic musical accompaniment unit 214 outputs musical accompaniment sound data of the musical accompaniment pattern employing the key operation signal as a fundamental note in synchronism with the musical accompaniment clock. This rhythm clock and the musical accompaniment clock are clock signals synchronized with the sequencer clock SQCK supplied from the system control circuit 116 within the CD player unit 100 to the control unit 201. Accordingly, if the frequency of the sequencer clock SQCK is changed in accordance with the change of the CD playback speed, then the read-out speeds of the rhythm pattern and of the musical accompaniment pattern also are changed in accordance therewith and these tempos become synchronized with the CD playback speed.

Outputs of the rhythm generating unit 214 and the automatic musical accompaniment unit 214 are supplied to a pitch converting unit 215. The pitch converting unit 215 processes particularly the musical accompaniment data in such a fashion that the pitch thereof is converted, on the basis of a pitch control signal supplied thereto from the control unit 201. This processing is similar to the processing done by the calculating unit 204, which will be described later. With respect to the rhythm sound data, the rhythm sound itself is a high-band/low-band frequency signal which is distant from a frequency of melody so that the rhythm sound data need not be in accordance with the change of the pitch of the CD reproduced sound. Accordingly, the rhythm sound data is not processed in this pitch conversion processing.

The rhythm sound data and the musical accompaniment sound data are supplied to a D/A converter 216, in which it is converted into an analog signal and then fed through a low-pass filter 217 to mixers 300, 303.

When the synchronizing recording mode is set, then the control unit 201 writes automatic playing data in the automatic playing memory 211 in response to operations of respective keys of the keyboard 202b. The automatic playing data is composed of key-on data and pitch data corresponding to the key pushing operation, key-off data and pitch data corresponding to the key releasing operation and count data generated from an SQ counter 212 at a timing point in which the key pushing operation or the key releasing operation is carried out since the synchronizing recording enabled state has been set. That is, if the key pushing operation or the key releasing operation is executed as an event, then the count data generated from the SQ counter 212 at a timing point of the event is written in the automatic playing memory 211 as an event time and also the above-mentioned data corresponding to the event is written therein as event data. The SQ counter 212 counts the sequencer clock SQCK and sends the resultant count data to the control unit 201.

When the synchronizing playback mode is set, the control unit 201 sequentially reads out the automatic playing data stored in the automatic playing memory 211 to thereby execute the processing operation of the automatic playing data supplied to the key code converting unit 203.

OPERATION OF MANUAL PLAYING MODE

When the manual playing mode is selected by the playing mode selecting switch 202a in the musical instrument operation unit 202, then the playback of the CD, the manual play by the keyboard 202b and the manual play under the condition that the CD is played back are all possible.

In the initial state after the system has been powered, the tempo setting data is [0]. This tempo setting data is stored as a value of register TMP within the system control circuit 116 and this value [0] is displayed on the display panel 130 located in the CD operation unit 115.

In this initial state, if the CD is set on the CD player unit 100 and if the play switch 128a is operated, then the playback of the CD is started. At that time, the CD is reproduced at the original normal speed and the pitch of the reproduced sound of the CD is the original pitch without change. Further, in this initial state, the player carries out the play by using the keyboard 202b, then the musical sound of the ordinary pitch without change is output.

If the tempo setting data is changed to other value (−9 to +9) than [0] by operating the tempo switch 129, then the system control circuit 116 within the CD player unit 100 sends the tempo setting data thus varied to the clock generating circuit 118 and the control unit 201 within the electronic keyboard musical instrument unit 200. The clock generating circuit 118 varies the frequencies of the clocks supplied to the respective circuits within the CD player unit 100 at the ratio corresponding to the tempo setting data and outputs the same. Also, the clock generating circuit 118 varies the sequencer clock SQCK by in the same ratio and supplies the clock of the thus varied frequency to the control unit 201 within the electronic keyboard musical instrument unit 200, thereby the playback speed of the CD being varied and the pitch of the reproduced sound of the CD being changed in response thereto.

The control unit 201 within the electronic keyboard musical instrument unit 200 outputs the pitch control signal corresponding to the input tempo setting data to the calculating unit 204. The calculating unit 204 calculates the key code input from the key code converting unit 203 in an addition fashion on the basis of this pitch control signal.

Let it be assumed that the up-switch 129a of the tempo switch 129 is operated once and the tempo setting data is [+1]. In this case, it is to be noted that the playback speed of the CD is increased by one step and the pitch of the reproduced sound of the CD is increased by the semitone. In this state, if the player pushes the key [C4#] on the keyboard 202b, then the key code derived from the key code converting unit 203 is formed of octave Code=[010] and note code=[0001]. The calculating unit 204 executes the addition calculation on this key code on the basis of the pitch control signal corresponding to the tempo setting data [+1]. In this processing, the note code=[0001] and the tempo setting data [+1]=[0001] are added so that the note code becomes [0010]. This note code corresponds with [D] sound. In this fashion, in response to the change of the pitch of the reproduced sound of the CD, the original musical sound [C4#] is automatically transposed only by the semitone.

Further, with respect to the rhythm and automatic musical accompaniment, the frequency of the sequencer clock SQCK supplied to the control unit 201 is changed as earlier noted, whereby the read-out speeds of the rhythm pattern and the musical accompaniment pattern also are changed in response thereto. Also, the rhythm sound data and the musical accompaniment sound data are automatically transposed by the pitch converting unit 215.

OPERATION IN THE SYNCHRONIZING RECORDING MODE

During the synchronizing recording mode, the player carries out the play by the keyboard 202b in unison with the reproduced sound of the CD and resultant automatic playing data is stored in the automatic playing memory 211.

Initially, the player sets the CD player unit 100 to the synchronizing recording mode by operating the playing mode selecting switch 202a. Then, the player adjusts the playback speed of the CD by operating the tempo switch 129 so that the player himself can play well. By this operation, the tempo setting data is determined and the value of this tempo setting data is stored in the register TMP within the system control circuit 116.

After having adjusted the playback speed of the CD, the player inputs the musical program number by operating the numeral switch 131 and the set switch 131' of the CD operation unit 115 and then operates the play switch 128a, whereby the playback of the CD musical program of the designated musical program number is started at the playback speed based on the tempo setting data. When this playback is started, the system control circuit 116 on the CD side outputs the CD start signal to the control unit 201 on the musical instrument side and starts outputting the absolute time data ABST.

Figure 9:
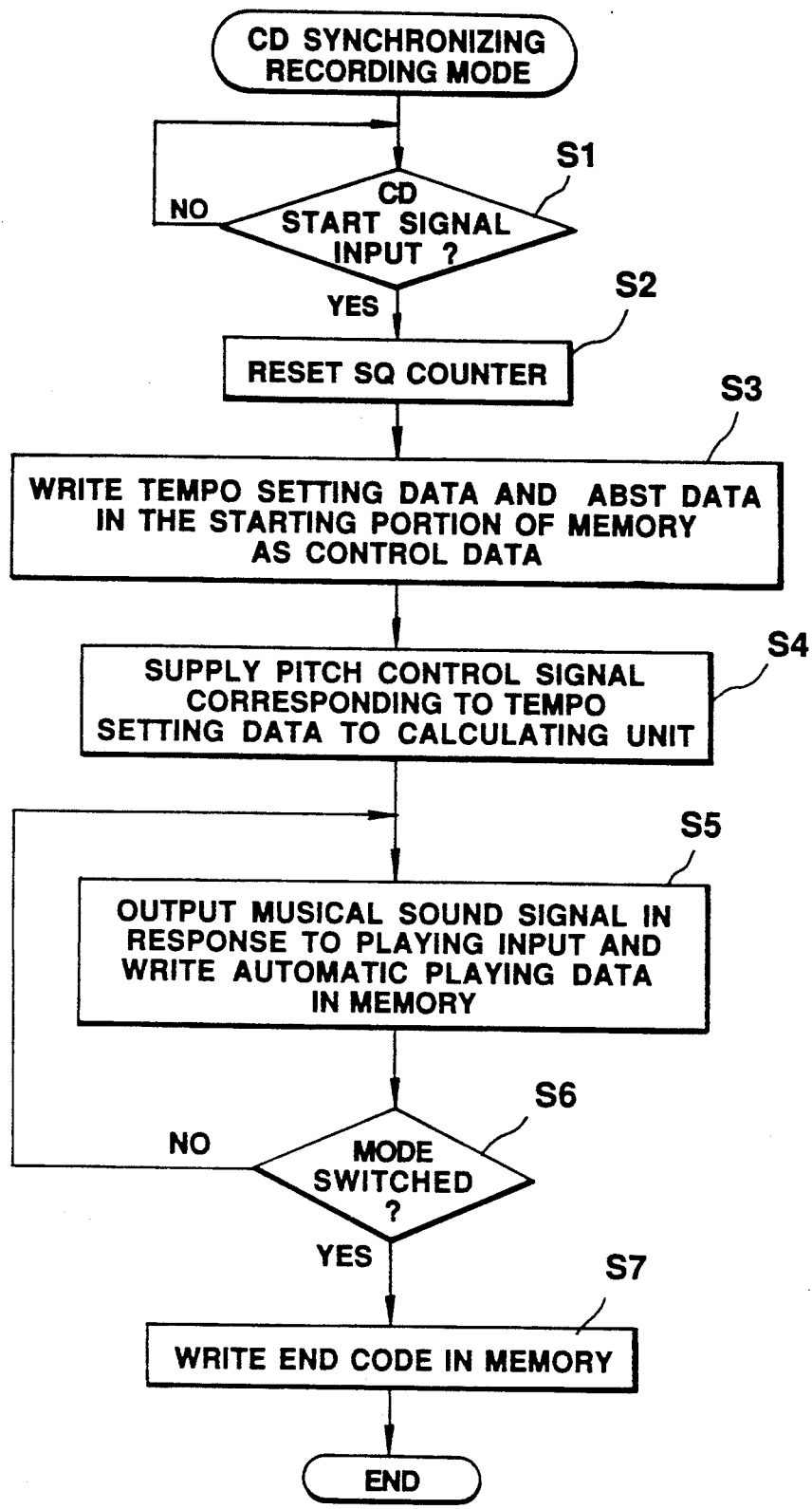
FIG. 9 is a flowchart to which reference will be made in explaining a synchronizing recording mode in the first embodiment of the present invention.

In this state, the control unit 201 on the musical instrument side executes operation shown in a flowchart forming FIG. 9. Referring to FIG. 9, it is determined in decision step S1 by the control unit 201 whether or not the CD start signal is input. If the input of the CD start signal is detected as represented by a YES at decision step S1, then the processing proceeds to step S2, whereat the SQ counter 212 is reset by a reset signal. Thus, the SQ counter 212 starts counting the sequencer clock SQCK of frequency corresponding to the CD playback speed in synchronism with the start of the playback of the CD. In the next step S3, the control unit 201 writes the input tempo setting data and absolute time data ABST in the starting portion of the automatic playing memory 211 as control data. The thus written control data are used to automatically select the musical program on the CD and to set the playback speed of the CD during a synchronizing playback mode, which will be described later.

In step S4, the control unit 201 supplies the pitch control signal corresponding to the tempo setting data to the calculating unit 204. Accordingly, the played sounds generated by the keyboard 202b will hereinafter be transposed at the ratio corresponding to the change of the pitch of the reproduced sound from the CD, as earlier noted.

Then, the player plays the musical program by the keyboard 202b in unison with the music program of the CD reproduced in the background. The control unit 201 sends a key operation signal to the key code converting unit 203 in accordance with the play done by the keyboard 202b. Simultaneously, in step S5, the control unit 201 writes the automatic playing data in the automatic playing memory 211.

Contents of the automatic playing data will be described below.

Automatic playing data corresponding to the key pushing operation might be a key pushing code and a key classification code of the pushed key. These key pushing/key releasing operations are called "event", and the key pushing code and the key classification code of the pushed key or the key releasing code and the key releasing code of the released key are called event data. Further, the count value counted by the SQ counter 212 at a timing point at which the event occurs is regarded as one of the automatic playing data and this count value is called an event time. More specifically, when any event occurs on the keyboard 202b, then the event time and event data at that timing point are sequentially written in the automatic playing memory 211 as the automatic playing data.

Figure 11:
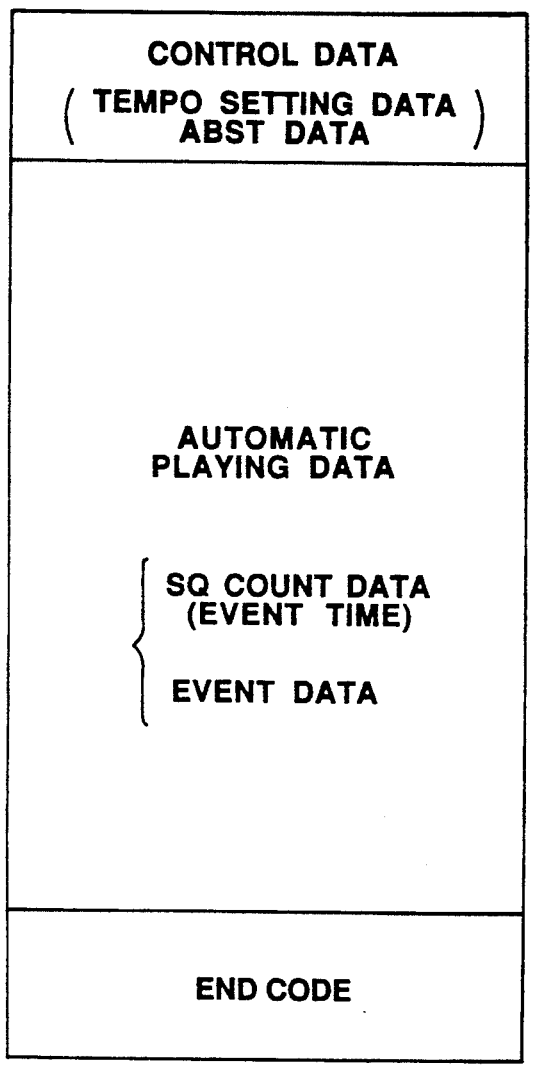
FIG. 11 is a schematic diagram showing data stored in an automatic playing memory 211 in the first embodiment of the present invention.

As described above, when the player plays the musical program by the keyboard 202b, the automatic playing data is simultaneously written in the memory 211. Then, when finishing the play, the player switches the CD player unit 100 to other mode than the synchronizing recording mode by operating the playing mode selecting switch 202a. It is determined in decision step S6 by the control unit 201 whether or not the synchronizing recording mode is switched to other mode. If the synchronizing recording mode is switched to other mode as represented by a YES at decision step S6, then the processing proceeds to the next step S7, whereat an end code is written in the automatic playing memory 211, and then the recording operation of the automatic playing data is ended. FIG. 11 shows the recorded state in the automatic playing memory 211.

OPERATION OF THE SYNCHRONIZING REPRODUCING MODE

During the synchronizing reproducing mode, the automatic playing data thus recorded is played back and this synchronizing reproducing mode includes the mode A and the mode B.

The mode A is the synchronizing playback mode in which the CD playback speed varied state and the tempo/musical sound pitch of the automatic play are automatically reproduced in the same states as those stored in the memory and then the automatic play is carried out, whereas the mode B is the synchronizing playback mode in which the playback speed of the CD is automatically returned to the original playback speed before being varied and the tempo/musical sound pitch of the automatic play is automatically varied in response thereto and then the automatic play is carried out. These modes A and B will be described below with reference to a flowchart forming FIG. 10.

Figure 10:
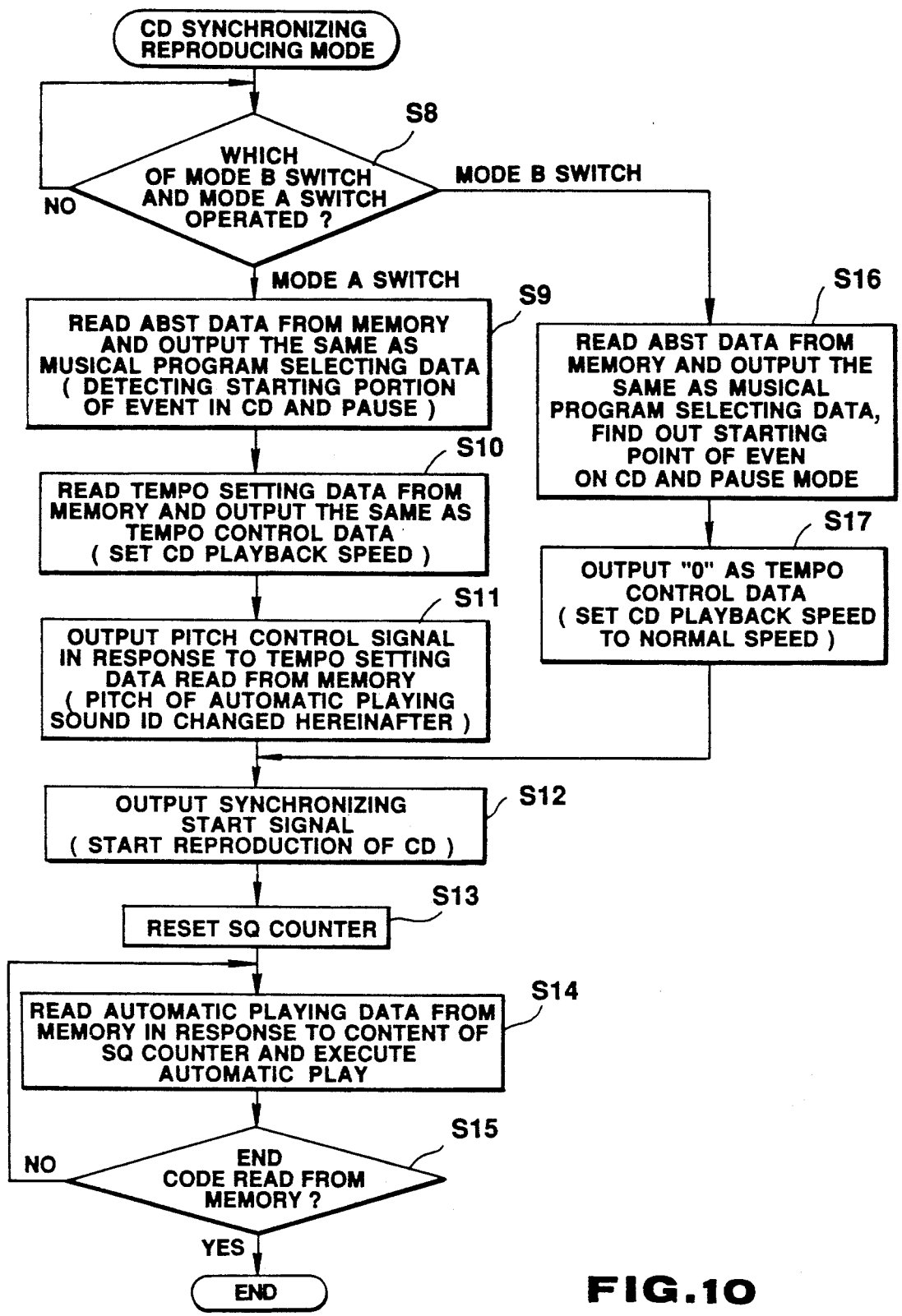
FIG. 10 is a flowchart to which reference will be made in explaining a synchronizing reproducing mode in the first embodiment of the present invention.

Initially, the player sets the synchronizing playback mode by operating the playing mode selecting switch 202a and then operates any one of the synchronizing playback switches, i.e., the mode A switch 202e and the mode B switch 202f. In step S8, it is determined by the control unit 201 whether the mode A switch 202e or the mode B switch 202f is operated. If it is determined by the control unit 201 that the mode A switch 202e is operated, then the following steps S9 to S15 in FIG. 10 are executed. If on the other hand it is determined by the control unit 201 that the mode B switch 202f is operated, then the following steps S16, S17 and steps S12 to S15 in FIG. 10 are executed.

More specifically, if the mode A switch 202e, for example, is operated, then the processing proceeds to the next step S9, whereat the control unit 201 reads out the control data stored at the header portion of the automatic playing memory 211 and supplies the absolute time data ABST to the system control circuit 116 on the CD side as musical program selection data. The content of the absolute time data ABST represents the CD absolute time determined at timing point where the playback of the CD is started during the synchronizing recording mode. In other words, the content of the absolute time data ABST corresponds with the absolute time of the starting portion of the musical program of the CD reproduced. When supplied with the absolute time data ABST, the system control circuit 116 detects the CD position coincident with the absolute time data ABST, that is, detects the starting point of the recorded musical program while reproducing the subcode of the CD, and sets the CD player unit 100 to the playback pause mode (playback and pause mode).

Further, in the next step S10, the control unit 201 outputs the tempo setting data read out from the automatic playing memory 211 to the system control circuit 116 on the CD side as tempo control data. The content of the tempo control data is the same as the value of the tempo setting data set when the playback of the CD is started. That is, the content of the tempo control data is equivalent to the playback speed set when the musical program on the CD reproduced this time is recorded in the synchronizing recording mode. When supplied with this tempo control data, the system control circuit 116 sets this tempo control data in the register TMP of the memory 211 and supplies the above tempo control data to the clock control circuit 118 and other circuits as tempo setting data, thereby the playback speed of the CD being set. Further, on the basis of the tempo setting data, the clock generating circuit 118 generates a clock for varying the playback speed of the CD and also converts the sequencer clock SQCK into the clock having frequency corresponding to the tempo data. The clock thus frequency-converted is supplied from the clock generating circuit 118 to the control unit 201 on the musical instrument side.

In step S11, the control unit 201 outputs a pitch control signal in response to the tempo setting data read out from the automatic playing memory 211. This pitch control signal is supplied to the calculating unit 4 and then the output of the key code converting unit 203 is converted so that the pitch of the musical sound is altered. This altered pitch corresponds with the change of interval of the reproduced sound of the CD.

Having finished the steps S9 to S11, the control unit 201 outputs the sync. start signal to the system control circuit 116 on the CD side in step S12. When supplied with this sync. start signal, the system control circuit 116 starts the playback of the CD in which the starting point of the musical program was detected and which was placed in the pause mode at step S9.

In the next step S13, the control unit 201 resets the SQ counter 212 and sequentially automatic playing data from the automatic playing memory 211 on the basis of the count value of the SQ counter 212, thereby the automatic play being executed. The SQ counter 212 is reset at the same time when the playback of the CD is started. Thereafter, the SQ counter 212 starts the counting of the sequencer clock SQCK. In step S14, for the initialization of the automatic playing processing, the control unit 201 reads the first data of the automatic playing data stored in the automatic playing memory 211. This data is formed of the event time and event data as earlier noted. Then, the processing proceeds to the next decision S15, whereat it is determined by the control unit 201 whether the content of the event time and the count value of the SQ counter 212 are coincident with each other. This decision timing point coincides with a timing point at which the player plays the first key during the synchronizing recording mode. During the coincidence between the content of the event time and the count value of the SQ counter 212 is checked, the control unit 201 supplies a key operation signal similar to that in the manual play to the key code converting unit 203 in response to the content of the event data which was already read-out. The key code converting unit 203 converts this key operation signal into the key code and outputs the same to the calculating unit 204. The calculating unit 204 processes this key code in an adding calculation fashion based on the pitch control signal, whereby the key code is converted so as to correspond with the interval of the reproduced sound of the CD. Then, the key code is supplied to the frequency information converting unit 205 and the transposed automatic playing sounds are reproduced by the processings of the succeeding respective circuits. Then, the control unit 201 reads the second automatic playing data from the automatic playing memory 211 and executes similar operations. That is, if it is determined that the event time in the automatic playing data read-out this time and the count value of the SQ counter 212 are coincident with each other, then the control unit 201 executes the playback processing of the automatic playing sounds on the basis of the earlier-read-out event data and also reads out the next automatic playing data.

In the above-mentioned automatic playing processing, the automatic playing tempo depends upon the frequency of the sequencer clock SQCK and the frequency of the sequencer clock SQCK depends on the playback speed of the CD with the result that the tempo of the automatic play and the playback speed of the CD are synchronized with each other. Further, since the pitch of the automatic playing sound is altered by the pitch control signal corresponding to the tempo setting data, the change of this pitch is coincident with the change of the interval of the reproduced sound of the CD. In this state, the CD playback speed at the synchronizing recording timing point, the tempo of the keyboard play, the interval of the reproduced sound of the CD and the pitch of the player are automatically reproduced without cumbersome adjustment of various switches.

When the automatic playing data are sequentially read out from the automatic playing data memory 211 and when the processing of the last automatic playing data is ended, an end code is read out from the memory 211. If the end code is detected by the control unit 201 as represented by a YES at decision step S15, then the control unit 201 ends a series of automatic playing processings. During this period, the system control circuit 116 on the CD side is continuously reproducing the CD and finishes the playback operation of the CD at timing point in which the musical program of the CD, now reproduced, is finished. The end of the playback of the musical program on the CD is detected by a control bit involved in the subcode.

Operation in the synchronizing playback mode provided by operating the mode B switch 202e will be described below with reference to FIG. 10.

The mode B is the CD synchronizing playback mode in which the playback speed of the CD is automatically returned to the original playback speed before being altered and the automatic tempo/musical sound pitch are automatically altered in response thereto for executing the automatic play.

The player sets the synchronizing playback mode by operating the playing mode selecting switch 202a and then operates the mode B switch 202f. The control unit 201 checks the kind of the synchronizing playback switch thus operated, and if it is determined in decision step S8 by the control unit 201 that the mode be switch 202f is operated, then the control unit 201 executes the following steps S16, S17 and steps S12 to S15 of FIG. 10.

Initially, in step S16, the control unit 201 reads out the control data stored in the header portion of the automatic playing memory 211 and supplies the absolute time data ABST to the system control circuit 16 on the CD side as musical program selection data. The content of the absolute time data ABST represents the CD absolute time set at a timing point in which the playback of the CD is started.

That is, the content of the absolute time data ABST is equivalent to the absolute time of the starting point of the musical program of the CD reproduced this time.

When supplied with the absolute time data ABST, the system control circuit 116 detects the CD position coincident with the absolute time data ABST, that is, detects the starting point of the recorded musical program while reproducing the subcode of the CD, and sets the CD player unit 100 to the playback pause mode (playback and pause mode).

Further, the control unit 201 outputs not the tempo setting data itself read out from the automatic playing memory 211 but tempo control data of value [0] to the system control circuit 116 on the CD side. This tempo control data [0] is not the tempo setting data of value set when the playback of the CD is started during the synchronizing recording mode, but is equivalent to data set when the playback speed of the CD is not varied, that is, when the CD is reproduced at the original normal playback speed.

When supplied with this tempo control data [0], the system control circuit 116 sets the tempo control data [0] in the register TMP in the memory 211 and supplies that tempo control data [0] to the clock control circuit 118 and other circuits as tempo setting data, whereby the playback speed of the CD is set to the normal speed according to the standards. Further, on the basis of the tempo setting data [0] supplied thereto, the clock generating circuit 118 generates various clocks of frequencies set in the normal mode and also outputs the sequencer clock SQCK to the control unit 201 on the musical instrument side as the frequency of the normal mode.

Having finished the steps S16 and S17, the control unit 201 outputs the sync. start signal to the system control circuit 116 on the CD side in step S12.

Steps next to the step S12 are similar to those in the above-mentioned mode A (steps S12 to S15). That is, in the automatic play in the mode B, the tempo setting data is [0] so that the playback speed of the CD is not altered and therefore the CD is reproduced at the original normal playback speed. At that time, since the frequency of the sequencer clock SQCK is synchronized with the normal speed of the CD, the tempo of the automatic play is different from that in the recording mode.

For example, if the speed of the CD was selected to be slow in the synchronizing recording mode, then the playing tempo for recording the automatic playing data would be selected to be slow in response thereto. In the mode B, in order to return the speed of the CD to the original normal speed during the synchronizing playback mode, the playback tempo of the automatic play is increased as compared with that of the recording mode. In this case, the tempo setting data is [0] and the pitch control signal is not output from the control unit 201 so that the pitch of the automatic playing sound is not converted (i.e., transposed).

As described above, in the automatic playing processing in the mode B, the CD playback speed set at a timing point in which the synchronizing recording is carried out, the tempo of the keyboard play, the interval of the CD reproduced sound and the pitch of the played sound are automatically returned to the normal conditions without cumbersome adjustment of various switches.

Operation in which the tempo switch 129 is operated in the synchronizing playing operation in the above-mentioned modes A and B will be described below.

In any of the modes A and B, for initialization, the value of the same tempo setting data as that in the recording time is preset to the register TMP on the CD side in the mode A and the value [0] in the normal state is preset to the register TMP on the CD side in the mode A as mentioned before. The system control circuit 116 outputs tempo setting data of the same content as that preset to the register TMP to the respective circuits. When the tempo switch 129 is operated, then the content in the register TMP is varied so that the value of the corresponding tempo setting data is changed. Accordingly, even in the automatic play, when the tempo switch 129 is operated, the playback speed of the CD is changed and the tempo of the automatic play is altered in accordance with the sequencer clock SQCK. Further, the pitch of the automatic play is changed in response to the change of interval of the CD reproduced sound. From the states of the mode A/-mode B set automatically as mentioned above, the user can adjust the playback speed of the CD properly. In the second embodiment, the present invention is applied to the electronic keyboard musical instrument having the CD playback function and the automatic play function. A system of the second embodiment can vary the playback speed of the CD and thus additionally includes a circuit for returning the CD reproduced sound whose interval is changed to the original interval. Accordingly, the system of the second embodiment does not need the circuit (the calculating unit 204 and the pitch control signal) for varying the played sound of the musical instrument unlike the system of the first embodiment.

In use, the play is executed in the background of the music of the CD whose playback speed is changed. Then, the played content of the musical instrument at that time is stored as automatic playing data and the automatic play is carried out in accordance with the thus stored content. In this case, the system of the second embodiment includes a mode C in which the altered state of the CD playback speed and the state of the automatic playing tempo are automatically reproduced in the same states as those stored before and a mode D in which the playback speed of the CD is automatically returned to the original playback speed and the tempo of the automatic play is automatically varied in response thereto.

In the following description of the second embodiment, the circuit configurations overlapping those of the first embodiment will not be described.

In the second embodiment, the arrangement of the system is substantially similar to that of the first embodiment but is different from the first embodiment as follows. That is, in the inside of the CD player unit 100 shown in FIG. 2, pitch changers 119'L, 119'R for L/R two channels are newly added to the output side of the L/R separating circuit 119 and the outputs thereof are supplied to the D/A converters 122, 120 shown in FIG. 2.

Operation of the pitch changers 119'L, 119'R will be described below with reference to FIG. 12 and FIGS. 13A to 13D.

Figure 12:
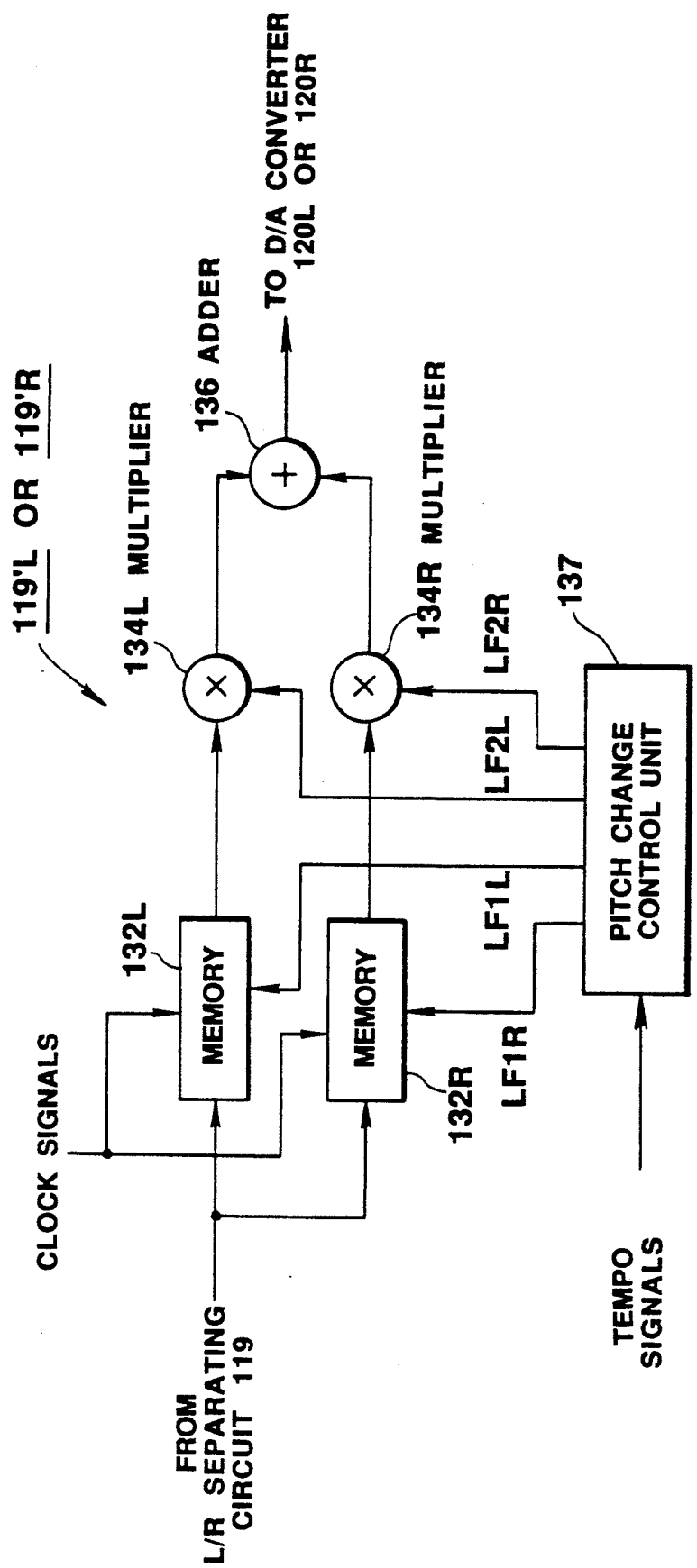
FIG. 12 shows in block form an arrangement of a pitch changer used in a second embodiment of the present invention.

FIG. 12 is a block diagram used to explain an operation principle of the pitch changers 124L, 124R.

Referring to FIG. 12, it will be seen that digital data output of one system, that is, L or R separated by the aforementioned L/R separating circuit 119 (FIG. 2) is input to memories 132L, 132R of the same content. The memories 132L, 132R are formed of a plurality of shift registers which simultaneously shift data of, for example, 16-bit width. In the memories 132L, 132R, each time the clock is input thereto, digital data of parallel 16 bits are written in the flip-flop group of the first stage of the shift register and at the same time, data of parallel 16 bits of respective stages are sequentially shifted to the next stages. Then, the flip-flop groups of the respective stages derive data of parallel 16 bits at respective timings. Thus, by selecting address signals (select signals) which select outputs of the respective stages of the shift register, the pitch can be varied as follows.

FIGS. 13A to 13D are respectively schematic diagrams used to explain the above-mentioned address signals LF1L, LF1R and amplitude data LF2L, LF2R applied to waveforms read-out by the address signals LF1L, LF1R. The address signals LF1L, LF1R and the amplitude data LF2L, LF2R are controlled by a pitch change control unit 137 on the basis of the tempo control signal.

Figure 13:
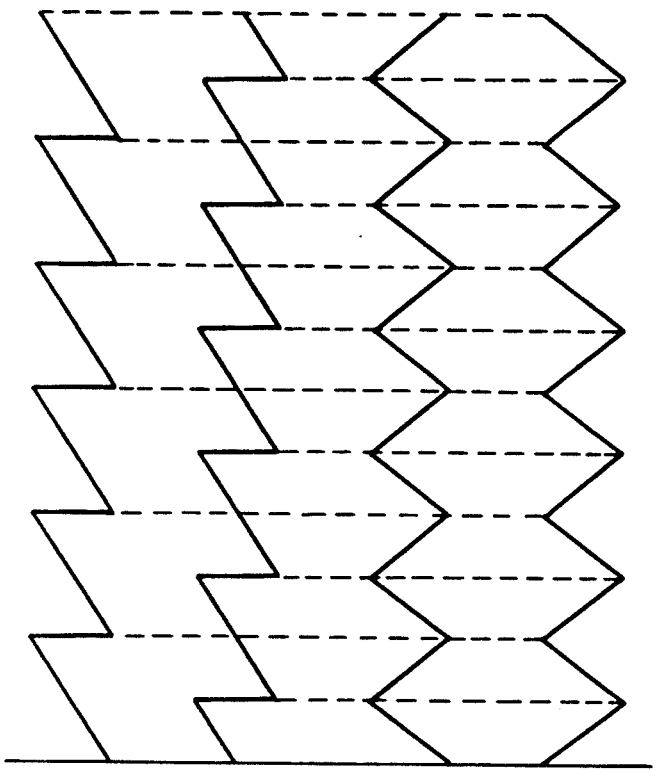
FIGS. 13A through 13D are respectively timing chart diagrams used to explain operation of the pitch changer.

FIG. 13A shows the address signal LF1L which reads the memory 132L, and the pitch can be increased and decreased by controlling this address signal LF1L. For example, in order to increase the pitch twice, the address signal LF1L must be controlled in such a fashion that the read-out stage may be shifted one by one in the forward direction in the memory 132L in response to the input clock. According to this method, however, it is unavoidable that the read-out speed becomes twice as high as the write speed. To remove this disadvantage, the address signal LF1L must be controlled such that the same waveform data may repeatedly read out twice.

However, if the same waveform is read out repeatedly, then the waveform generally becomes discontinuous at the repeated point. For this reason, the input data is stored in the memory 132R shown in FIG. 12 and the waveform data is read out from the memory 132R by the address signal LF1R which results from phase-shifting the address signal LF1L as shown in FIG. 13B. If the two waveform data read out from the memories 132L, 132R as described above are recorded in a cross-fade fashion as shown in FIGS. 13C, 13D, then it is possible to remove the influence of the discontinuous waveform.

More specifically, the waveform output read-out by the address signal LF1L shown in FIG. 13A is multiplied with the amplitude data LF2L shown in FIG. 13C by a multiplier 134L. Similarly, the waveform output read-out by the address signal LF1R shown in FIG. 13B is multiplied with the amplitude data LF2R shown in FIG. 13D by a multiplier 134R. In this case, the cycles of the amplitude data LF2L, LF2R shown in FIGS. 13C, 13D are selected to be equal to those of the address signals LF1L, LF1R shown in FIGS. 13A, 13B. Thereafter, the outputs of the multipliers 134L, 134R are added by an adder 136 of FIG. 12 and thereby obtained as an output of the pitch changer.

While the pitch of the input data is increased twice as described above, the pitch may be changed by other magnification by controlling the address signals LF1L, LF1R and the amplitude data LF2L, LF2R by the pitch change control unit 137 shown in FIG. 12.

If the playback speed of the CD is varied by a multiple of 2 by the pitch changers 119'L, 119'R of the above-mentioned arrangement, then the pitch is varied by a multiple of 2 by the tempo Setting data. As described above, when the tempo is varied by changing the playback speed of the CD, the pitch changers 119'L and 119'L are automatically energized, thereby preventing the pitch in the reproduced sound of the CD from being changed.

OPERATION IN THE SYNCHRONIZING RECORDING MODE

In the synchronizing recording mode according to the second embodiment, the player plays by the keyboard 202b and resultant automatic playing data is stored in the automatic playing memory 211.

Initially, the player sets the CD player unit 100 in the synchronizing recording mode by operating the playing mode selecting switch 202a. Then, the playback speed of the CD is adjusted by operating the tempo switch 129 so that the player can play well. By this operation, tempo setting data is determined and the value of this tempo setting data is stored in the register TMP within the system control circuit 116.

Having adjusted the playback speed of the CD, the player inputs the musical program number by the numeral switch 131 and the set switch 131' of the CD player unit 115, and then operates the play switch 128a, whereby the playback of the CD musical program of the designated musical program number is started at the playback speed based on the tempo setting data. When this playback is started, then the system control circuit 116 on the CD side outputs the CD start signal to the control unit 201 on the musical instrument side and also starts outputting the absolute time data ABST. Further, the CD reproduced sound in this case is returned to the same interval as that in the normal speed mode by the pitch changer 119'L, 119'R shown in FIG. 12.

Figure 14:
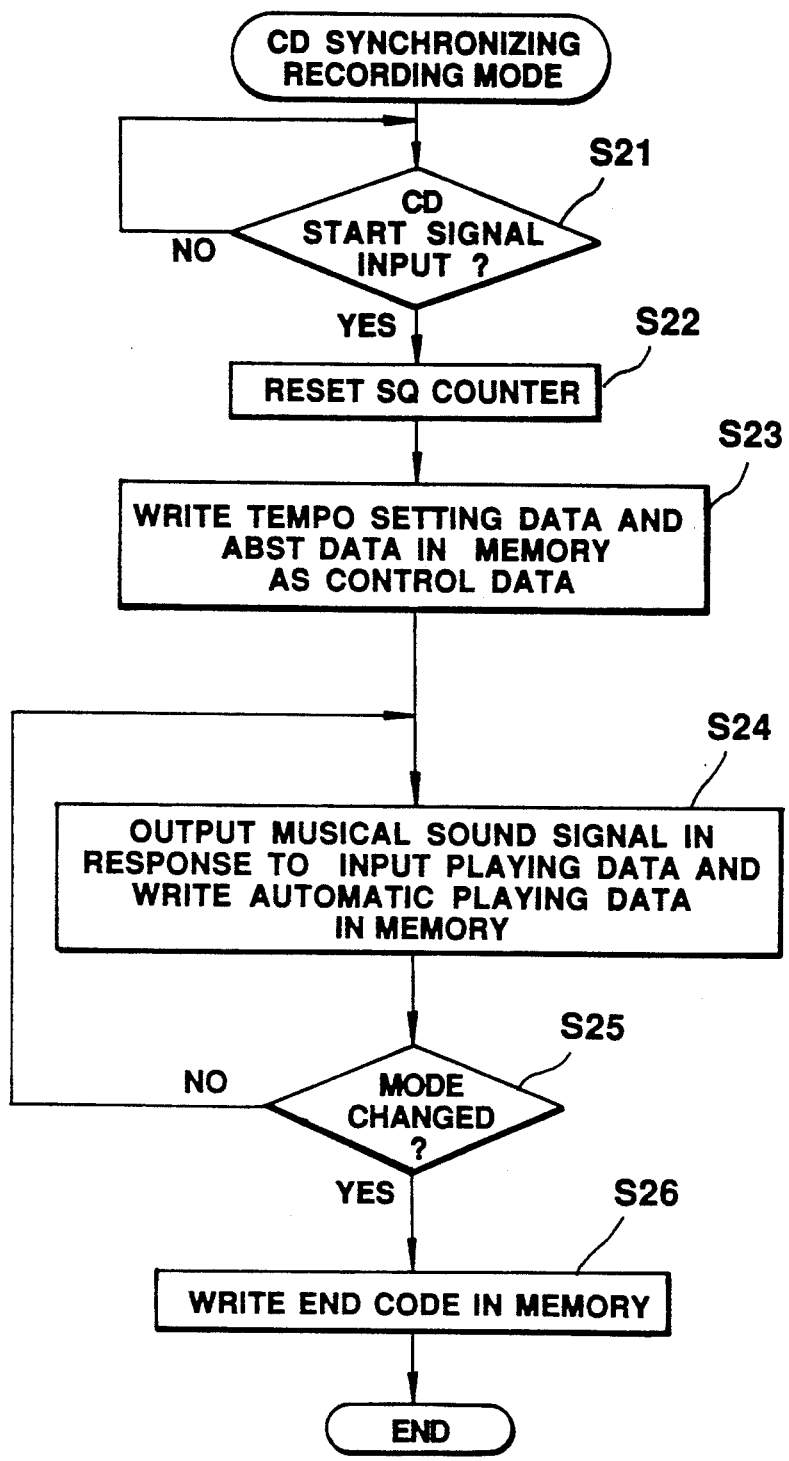
FIG. 14 is a flowchart to which reference will be made in explaining a synchronizing recording mode in the second embodiment of the present invention.

In this state, the control unit 201 on the musical instrument side executes operation shown in the flowchart forming FIG. 14.

Referring to FIG. 14, it is determined in decision step S21 by the control unit 201 whether or not the CD start signal is input. If the input of the CD start signal is detected as represented by a YES at decision step S21, then the processing proceeds to the next step S22, whereat the SQ counter 212 is reset by the reset signal. Thus, the SQ counter 212 starts the counting of the sequencer clock SQCK having the frequency corresponding to the playback speed of the CD in synchronism with the start of the playback of the CD. In the next step S23, the control unit 201 writes the input tempo setting data and absolute time data ABST in the header portion of the automatic playing memory 211 as control data. This control data is used to automatically select the musical program and the playback speed of the CD in the synchronizing playback mode which will be described later.

Then, the player plays by the keyboard 202b in unison with the musical program of the CD reproduced in the background. The control unit 201 supplies the key operation signal to the key code converting unit 203 in accordance with the play done by the keyboard 202b as mentioned before. Simultaneously, the control unit 201 writes the automatic playing data in the automatic playing memory 211 in step S24. The content of the automatic playing data is the same as that of the aforementioned first embodiment.

As described above, when the player plays by the keyboard 202b, the automatic playing data is written in the memory 211 at the same time. After finishing the play, the player sets the CD player unit 100 in other mode than the synchronizing recording mode by operating the play mode selecting switch 202a. If it is determined in the next decision step S25 by the control unit 201 that the CD player unit 100 is placed in the mode other than the synchronizing recording mode, then the processing proceeds to step S26, wherein the control unit 201 writes the end code in the automatic playing memory 211. Then, the recording operation of the automatic playing data is ended.

THE SYNCHRONIZING PLAYBACK MODE

Figure 15:
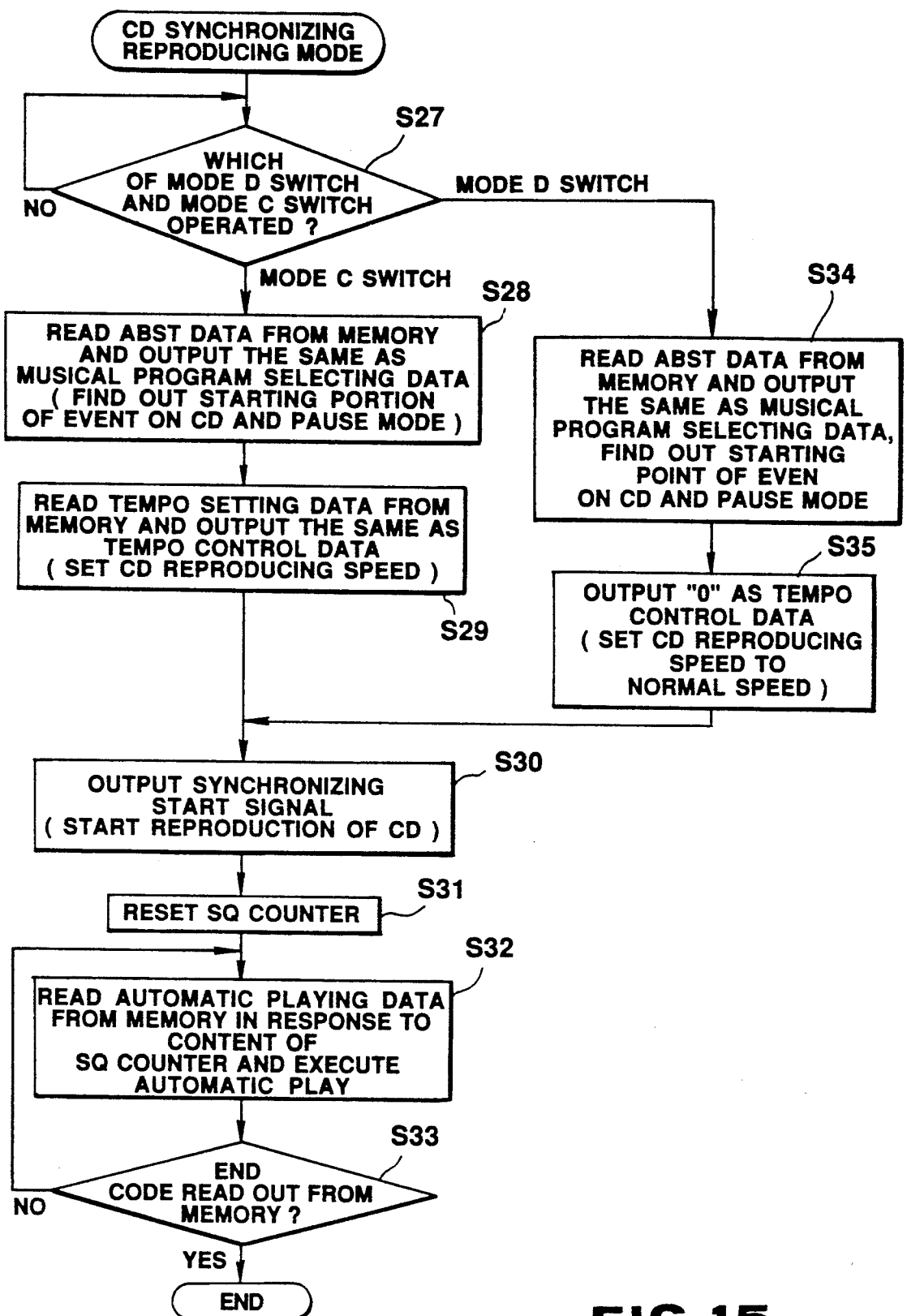
FIG. 15 is a flowchart to which reference will be made in explaining a synchronizing reproducing mode in the second embodiment of the present invention.

The synchronizing playback mode according to the second embodiment of the present invention will be described below with reference to a flowchart forming FIG. 15. This synchronizing playback mode plays back the automatic playing data recorded as described above and includes the modes C and D.

The mode C is the synchronizing playback mode in which the altered state of the CD playback speed and the state of the automatic playing tempo are automatically reproduced in the same states as those in the recording timing point and the automatic play is carried out, whereas the mode D is the synchronizing playback mode in which the playback speed of the CD is automatically returned to the original playback speed before being changed and the tempo of the automatic play is automatically altered in accordance therewith for carrying out the automatic play.

Initially, the player sets the synchronizing playback mode by operating the playing mode selecting switch 202a and then operates any one of the synchronizing playback switches, i.e., mode C switch and mode D switch. In decision step S27, it is determined by the control unit 201 whether the operated synchronizing playback switch is the mode C switch or the mode D switch. If it is determined in decision step S27 by the control unit 201 that the mode C switch is operated, then the control unit 201 executes steps S28 through S33 in FIG. 15. If on the other hand it is determined in decision step S27 by the control unit 201 that the mode D switch is operated, then the control unit 201 executes steps S34, S35 and steps S30 to S33 in FIG. 15.

If the mode C switch, for example, is operated, then the processing proceeds to the next step S28, whereat the control unit 201 reads out the control data stored in the header portion of the automatic playing memory 211 and supplies the absolute time data ABST to the system control circuit 116 on the CD side as the musical program selecting data. The content of the ABST data represents the absolute time data of the CD set at timing point in which the playback of the CD is started in the synchronizing recording mode, that is, the content of the ABST data is equivalent to the absolute time of the starting point of the musical program on the CD reproduced this time. When supplied with the ABST data, the system control circuit 116 detects the starting point of the musical program so as to detect the CD position coincident with the ABST data while reproducing the sub code on the CD, and then sets the CD player unit 100 in the playback pause mode at a position in which the starting point of the musical program is detected.

The control unit 201 outputs the tempo setting data read-out from the automatic playing memory 211 to the system control circuit 116 on the CD side as tempo control data. The content of the tempo control data is the same as the value of the tempo setting data set at a timing point in which the playback of the CD is started, that is, the content of the tempo control data is equivalent to the playback speed at a timing point in which the musical program on the CD reproduced this time was recorded in the synchronizing recording mode. When supplied with this tempo control data, the system control circuit 116 sets the tempo control data in the register TMP of the memory 211 and also supplies that tempo control data to the clock generating circuit 118 and other circuits as the tempo setting data, thereby the playback speed of the CD being set. Further, on the basis of the tempo setting data, the clock generating circuit 118 generates a clock which varies the playback speed of the CD and outputs the sequencer clock SQCK to the control unit 201 on the musical instrument side in the converted form of the frequency corresponding to the tempo data.

The system control circuit 116 on the CD side outputs this tempo setting data to the pitch changers 119′L, 119′R, and the pitch changers 119′L, 119′R return the interval of the reproduced sound of the CD to the original one in response to the tempo setting data.

After finishing steps S28 and S29, the control unit 201 outputs the synchronizing start signal to the system control circuit 116 on the CD side in the next step S30. When supplied with this synchronizing start signal, the system control circuit 116 starts the playback of the CD in which the starting portion of the musical program was detected and which was placed in the playback pause mode.

In the next step S31, the control unit 201 resets the SQ counter 212 and sequentially reads out automatic playing data from the automatic playing memory 211 on the basis of the count value of the SQ counter 212 for effecting the automatic play. The reset timing of the SQ counter 212 is the same as the timing point at which the playback of the CD is started, and thereafter, the SQ counter 212 starts the counting of the sequencer clock SQCK. in step S32, the control unit 201 reads out the first data of the automatic playing data stored in the automatic playing memory 211 for initialization. This first data comprises the event time and the event data as described before. Then, the control unit 201 determines whether or not the content of the event time is coincident with the count value of the SQ counter 212. This coincidence judging timing point is coincident with a timing point at which the player plays the first key. During the coincidence between the content of the event time and the count value of the SQ counter 212 is judged, the control unit 201 supplies a key operation signal similar to that in the manual play to the key code converting unit 203 in response to the content of the event data which was already read-out. The key code converting unit 203 converts this key operation signal into the key code and outputs the key code thus converted to the calculating unit 204. In the system according to the second embodiment, since the pitch control signal is not output and the calculating unit 204 does not carry out the calculating operation, the key code is directly supplied to the frequency information converting unit 205 and the automatic playing sound is reproduced by the processings of the succeeding respective circuits. Then, the control unit 201 reads out the second automatic playing data and executes the similar operations. That is, if the event time in the automatic playing data read-out this time and the count value of the SQ counter 212 become coincident with each other, then the control unit 201 executes the playback processing of the automatic playing sound on the basis of the earlier read-out event data and also reads out the next automatic playing data.

In the above-mentioned automatic playing processing, the tempo of the automatic play depends upon the frequency of the sequencer clock SQCK. Since the frequency of the sequencer clock SQCK depend on the playback speed of the CD, the tempo of the automatic play and the playback speed of the CD are synchronized with each other. Further, since the interval of the reproduced sound of the CD is returned to the original interval by the pitch changers 119′L, 119′R, the pitch of the automatic playing sound directly corresponds to the interval of the reproduced sound of the CD. In this state, the CD playback speed at the synchronizing recording timing point and the tempo of the keyboard play are automatically reproduced without cumbersome adjustment of the respective switches.

If the automatic playing data is sequentially read out from the memory 211 and if the processing done on the basis of the last automatic playing data is ended, then the end code is read out from the memory 211. If the control unit 201 detects this end code as represented by a YES at decision step S33, then the control unit 201 ends a series of automatic playing processings. During this period, the system control circuit 116 on the CD side continues the playback operation of the CD and ends the playback operation of the CD at a timing point in which the musical program on the CD now reproduced is finished. The end of the musical program on the CD is detected by the control bit involved in the subcode.

Operation in which the mode D switch is operated will be described below with also reference to FIG. 15.

The mode D is the CD synchronizing playback mode in which the playback speed of the CD is returned to the original playback speed before being changed and the tempo of the automatic play is automatically altered in response thereto so as to carry out the automatic play.

The player sets the synchronizing playback mode by operating the playing mode selecting switch 202a and then operates the mode D switch. Then, it is determined in the next decision step S27 by the control unit whether or not the synchronizing playback switch thus operated is the mode D switch. If it is determined in decision step S27 by the control unit 201 that the mode D switch is operated, then the control unit 201 executes steps S34, S35 and steps S30 to S33 in FIG. 15.

In the next step S34, the control unit 201 reads out the control data stored in the header portion of the automatic playing memory 211 and supplies the absolute time data ABST in the read-out data to the system control circuit 116 on the cd side as musical program selection data. The content of this absolute time data ABST represents the absolute time of the CD set at the timing point in which the playback of the CD is started in the synchronizing recording mode, that is, the content of the absolute time data ABST is equivalent to the absolute time of the starting portion of the musical program on the CD reproduced this time.

When supplied with the absolute time data ABST, the system control circuit 116 performs the starting point detecting operation so as to detect the CD position coincident with the absolute time data ABST while reproducing the subcode of the CD, and then sets the playback pause mode at the position in which the CD position coincident with the absolute time data ABST is detected.

The control unit 201 outputs, instead of the tempo setting data read out from the automatic playing memory 211, tempo control data of value [0] to the system control circuit 116. This tempo control data [0] is not the value of the tempo setting data set at a timing point in which the playback of the CD is started in the synchronizing recording mode but is equivalent to data set in the original normal speed mode in which the playback speed of the CD is not changed.

The system control circuit 116 sets the data [0] in the register TMP of the memory 211 in response to the input tempo control data [0] and supplies the data [0] to the clock generating circuit 118 and other circuits as tempo setting data, thereby the playback speed of the CD being set to the normal speed according to the standards. Further, on the basis of the tempo setting data [0], the clock generating circuit 118 outputs various clocks in the form of the frequencies in the normal speed mode and also outputs the sequencer clock SQCK to the control Unit 201 in the converted form of the frequency in the normal speed mode.

After finishing steps S34 and S35, the control unit 201 outputs the sync. start signal to the system control circuit 116 on the CD side in step S30.

The processing next to the step S30 are similar to the processings (steps S30 to S33) in the above-mentioned mode C. That is, since the tempo setting data is [0] in the automatic play in the mode D, the playback speed of the CD is not changed and the CD is played back at the original normal speed. At that time, since the sequencer clock SQCK has the frequency synchronized with the normal speed of the CD, the tempo of the automatic play is different from that in the recording timing point.

For example, if the speed of the CD was selected to be slow in the synchronizing recording mode, then the tempo of the automatic play for recording the automatic playing data would be selected to be slow in response to the speed of the CD. In the mode D, the speed of the CD is returned to the original normal speed in the synchronizing playback mode so that the playback tempo of the automatic play is increased as compared with that in the recording mode. Further, since the CD is reproduced at the normal playback speed, the interval of the reproduced sound of the CD is never changed and the pitch of the automatic playing sound directly corresponds with the interval of the reproduced sound of the CD.

As described above, in the automatic playing processing in the mode D, the playback speed of the CD in the synchronizing recording timing point and the tempo of the keyboard play are automatically returned to those in the normal mode without cumbersome adjustment of the respective switches.

Operation in which the tempo switch 129 is operated during the synchronizing play in the above-mentioned mode C and mode D will be described below.

In any of the modes C and D, for initialization, the value of the same tempo setting data as that in the recording mode is preset to the register TMP on the CD side in the mode C, whereas the value [0] in the normal state is preset thereto in the mode D as described before. The system control circuit 116 outputs tempo setting data of the same content as that preset to the register TMP to the respective circuits. Accordingly, if the tempo switch 129 is operated, then the content of the register TMP is changed with the result that the value of the corresponding tempo setting data is changed. Therefore, even in the automatic play, the playback speed of the CD is changed by the operation of the tempo switch 129 and the tempo of the automatic play also is changed in response to the change of the sequencer clock SQCK. Further, the changed interval of the CD reproduced sound at that time is returned to the original interval by the pitch changers 119'L and 119'R.

As a consequence, the user can properly adjust the playback speed of the CD under the condition such that the tempo of the automatic play is synchronized with the CD, from the mode C/mode D set automatically.

In the third embodiment, the present invention is applied to the electronic keyboard musical instrument having CD playback function and automatic playing function. The system of the third embodiment is arranged so as to reproduce a CD in which data is recorded according to the CD-graphics standard.

This CD-graphics standard is the standard which records graphics data of still image in the subcode.

Initially, a format of graphics data recorded in the subcode of the CD will be described with reference to FIGS. 16 to 23.

THE CD-GRAPHICS FORMAT

Figure 16:
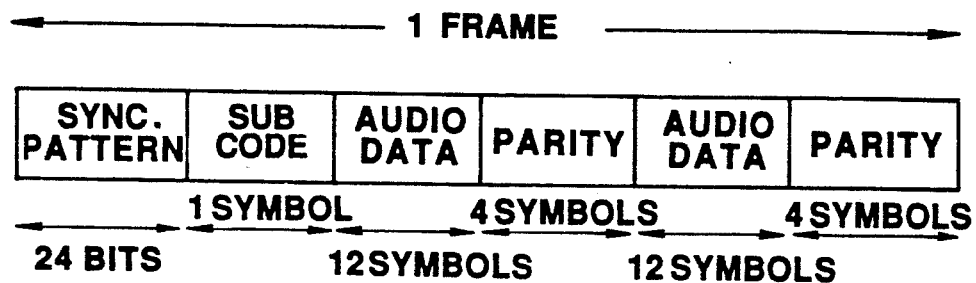
FIG. 16 is a diagram showing a format of one frame of a CD.

FIG. 16 show a format of data recorded on the CD. AS shown in FIG. 16, one frame formed of EFM-modulated 588 channel bits generally comprises of a sync. pattern of 24 bits provided as a frame sync. signal, subcode data of one symbol (=14 channel bits), audio data of 12 symbols and a parity of 4 symbols for error-detection and error-correction. Data of 3 bits called a margin bit is inserted between the symbols and a DC component is suppressed by this margin bit.

Figure 17:
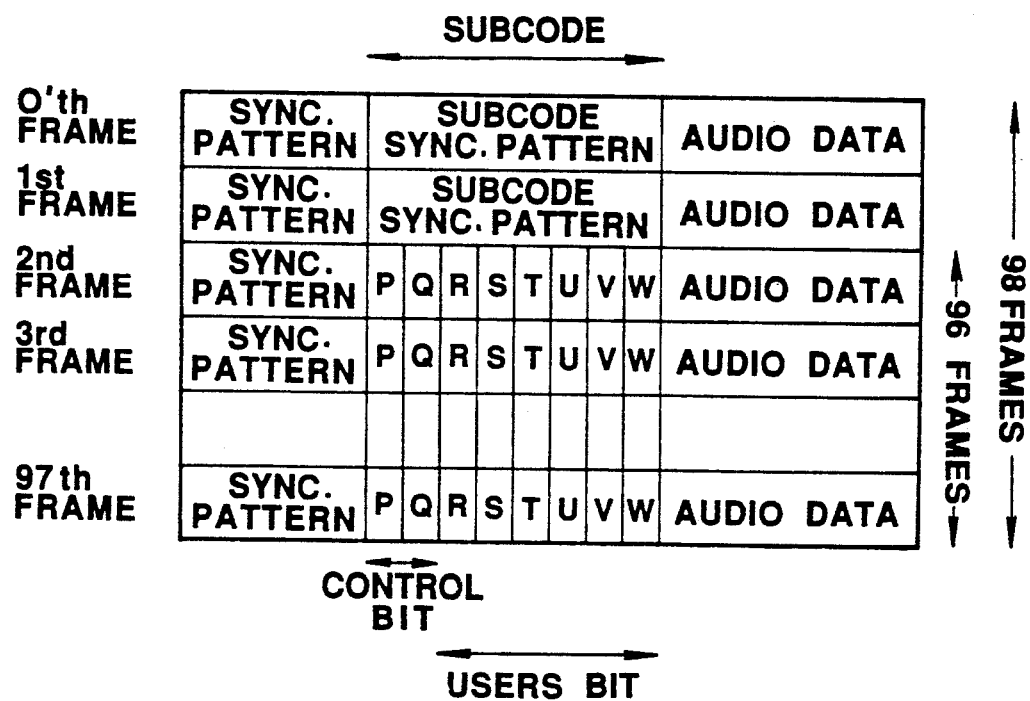
FIG. 17 is a diagram showing a subcoding format of the CD.

In the subcode, one subcoding frame is formed of 98 frames as shown in FIG. 17.

More specifically, as shown in FIG. 17, of subcode data of 98 symbols which result from repeating data of one frame by 98 frames, the first 2 symbols are formed as a subcode pattern and bits of respective symbols in the remaining 96 symbols are formed as data P to W. Of P to Q data, P and Q data are what might be called control bits, and R to W data are what might be called users bits. The P data is utilized as a code to indicate an interval between musical programs or the playback period of the musical program, while the Q data is utilized as a code to indicate an address (time code) of information recorded on the disc, which is illustrated more in detail in FIG. 18.

Figures 18, 19:
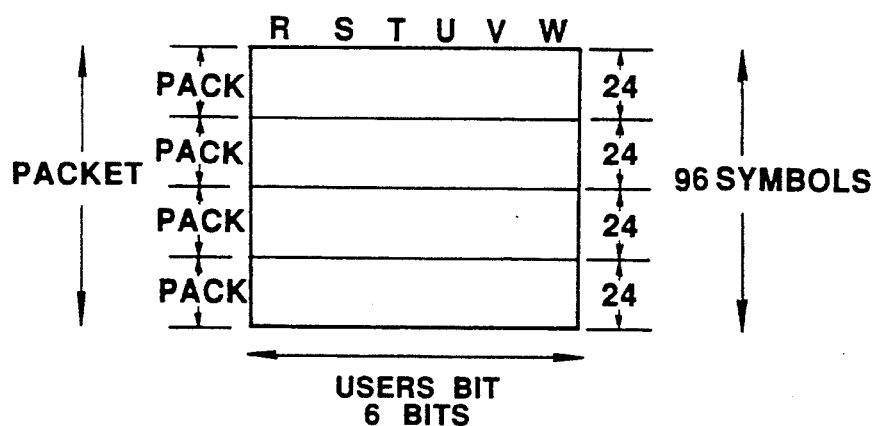
FIG. 18 is a diagram showing a format of Q data of the CD.
FIG. 19 is a diagram showing the state of a pack and packet of the CD.

As shown in FIG. 18, the Q data is formed in the units of 96 bits, and these bits are composed of a flag (4 bits) indicative of on-off information of emphasis of audio data, an address (4 bits) mainly formed of present [0001] data, a track number (01 to 99) (8 bits) indicative of the musical program number, an index code (01 to 99) indicative of chapter of one musical program, running time data respectively indicating the running time of one musical program in the units of minute (PMIN) (8 bits), second (PSEC) (8 bits) and subcode frame (PFRAME) (8 bits), a zero code (8 bits) in which data of only present [00000000] is defined, absolute time data respectively indicating the running time from the starting point of the disc in the units of minute (AMIN) (8 bits), second (ASEC) (8 bits) and subcode frame (AFRAME) (8 bits) and an error-detection code (16 bits), in that order.

In the CD, a read-in area, a program area (intermediate portion between the read-in area and a read-out area) and the read-out area (outermost periphery) are provided respectively and informations indicated by the Q data are different in the above-mentioned respective areas. Particularly, a subcode information in the read-in area is called a table of content (TOC). If this TOC is read out prior to the playback of the disc, then it is possible to know the total number of tracks within the disc, the total time of play or the like.

More specifically, in the read-in-area, the track number of the Q data is set to [00], and PMIN when a code called a POINT set instead of the index code is [A0] indicates the first track number of the disc, the PMIN when the POINT is [A1] indicates the last track number of the disc and PMIN, PSEC, PFRAME when the POINT is [A2] indicate absolute times of the starting points of the read-out area. The reason that the code POINT of the TOC in the case of [A0] indicates the first track number is that the first track number is not always expressed as "track number=1" according to the standards.

As a consequence, from the PMIN obtained when POINT=A0 and A1, the number of musical programs recorded on the disc can be calculated, and also the sum total playing time of the whole disc can be calculated from the PMIN, PSEC and PFRAME obtained when POINT=A2.

When the code POINT lies in a range of 01 to 99, the starting time (absolute time) of the track number indicated by the numeral is represented by PMIN, PSEC and PFRAME so that the access to the track designated by the user becomes possible.

Then, the R to W data provided as the users bits will be described below with reference to FIG. 19.

As shown in FIG. 19, the users bit is formed of 6 bits from R to W and 24 symbols, which result from dividing 96 symbols equally by 4, are treated as the minimum unit (pack) of data. 4 packs (96 symbols) are grouped as one set, which is called one pack.

Figure 20:
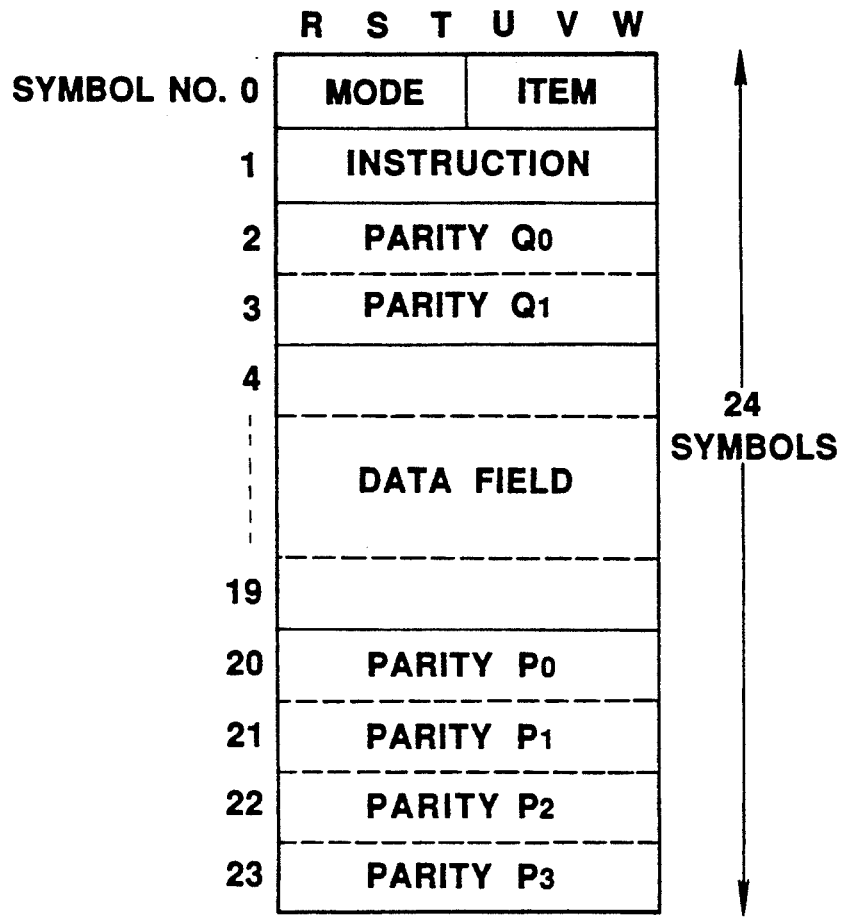
FIG. 20 is a diagram showing a format of one pack of the CD.

The arrangement of one pack will be described more fully with reference to FIG. 20. As shown in FIG. 20, the first symbol (hereinafter referred to as a symbol 0) represents a mode (3 bits) and an item (3 bits), and these mode and item will be described more in detail later.

The succeeding symbol 1 is an instruction representing the kind of commands, and symbol 2 and symbol 3 are parity Q (Q0 and Q1) which are error-detection and error-correction codes of the symbols 0 to 3. Symbols 4 to 19 succeeding to the parity are data field, which is formed of graphics data or the like. Symbols 20 to 23 following the data field are parity P (P0, P1, P2, P3) which are error-detection and error-correction codes used to protect the informations (symbols 0 to 23) within the pack.

The above-mentioned mode and item will be described below.

The combinations of the mode and item defined at present according to the CD standards are as follows:
 mode 0 (000), item 0 (000) . . . ZERO mode
 mode 1 (001), item 0 (000) . . . line graphics mode
 mode 1 (001), item 1 (001) . . . TV graphics mode
 mode 7 (111), item 0 (000) . . . user mode Other combinations of modes and items which are not yet defined are reserved for future use.

As will be clear from the above-mentioned definitions, if the mode is the mode 1, then data recorded on the data field is the graphics data, whereas if the mode is the mode 0 conversely, then the data recorded on the data field is not corresponding with the graphics data.

FIG. 21 illustrates an arrangement of the pack in the TV graphics mode presented by the combination of the mode 1 and the item 1, wherein graphics data is accommodated in the data field (FIG. 20)

Figure 23:
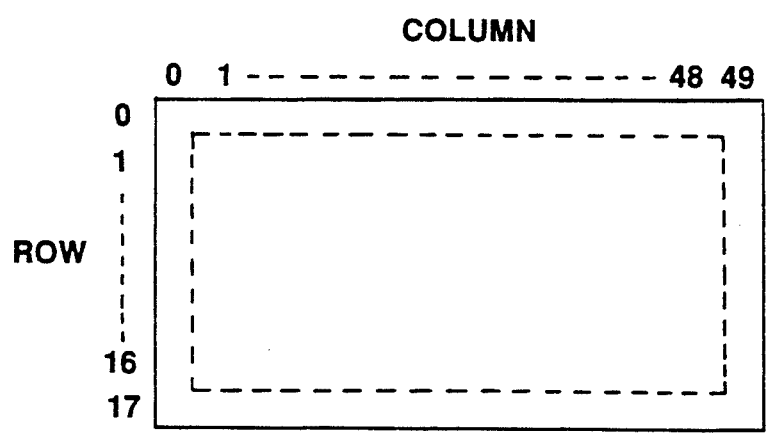
FIG. 23 is a diagram showing the state of font data and a picture screen of the CD.

According to the TV graphics mode, an image is displayed on the picture screen of the television receiver and the number of fonts which can be displayed is 48 in the lateral (ROW) direction and 16 in the longitudinal (COLUMN) direction as shown in FIG. 23. In this case, one font is added to the upper, lower, left and right portions of the outside of the screen area and image data is formed of 50 fonts in the lateral direction and 18 fonts in the longitudinal direction as shown in FIG. 23. Outermost fonts are utilized as pointers and not displayed on the picture screen of the television receiver. In this case, the font is the unit forming the picture screen in which 6 picture elements (pixels) are arrayed in the lateral direction and 12 pixels are arrayed in the longitudinal direction.

Figure 22:
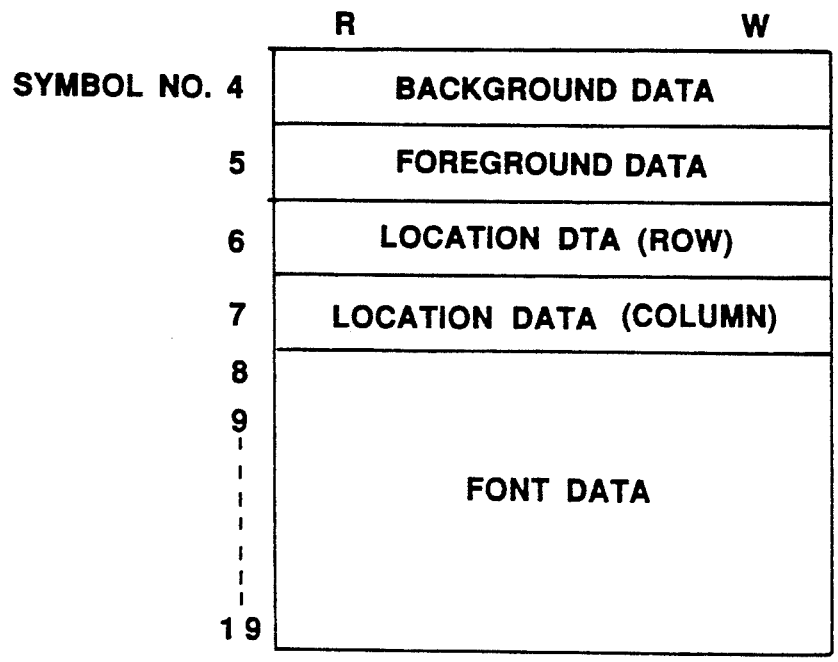
FIG. 22 is a diagram showing a format of font data of the CD.

FIG. 22 shows an example of an arrangement of data field (graphics data) in the TV graphics mode. In this case, as shown in FIG. 22, the address (ROW) in the lateral direction is defined by the symbol 6 and the address (COLUMN) in the longitudinal direction is defined by the symbol 7. Font data displayed on these addresses are written in the symbols 8 and 19. Of the font data, data defined by the symbol 4 is utilized as background data and data defined by the symbol 5 is utilized as foreground data.

As described above, images, which result from dividing the image of one picture screen shown in FIG. 23 by 900, are recorded on the font data shown in FIG. 22 as bit map data.

Since four font data shown in FIG. 22 are formed in one subcoding frame shown in FIG. 17 (see FIG. 19), one still image data of one picture screen are recorded on the CD under the condition such that they are dispersed in 255 (=900/4) subcoding frames. One subcoding frame is composed of 98 frames, the one frame of which is illustrated in FIG. 16. Accordingly, 22050 frames constitute the still image of one picture screen so that, each time the CD is reproduced at normal playback speed during a period of about 3 seconds, images are sequentially switched and played back.

In the third embodiment of the present invention, landscapes or the like matched with music, text, atmosphere of music are recorded as the images.

THE CIRCUIT ARRANGEMENT OF THE CD PLAYER UNIT

The outline of the CD-graphics standards are described as above. In this embodiment, in order to play back the CD in which graphics data of still image is recorded in the subcode, respective circuits shown in FIG. 24 are additionally provided in addition to the circuit arrangement of the CD player unit shown in FIG. 2.

Figure 24:
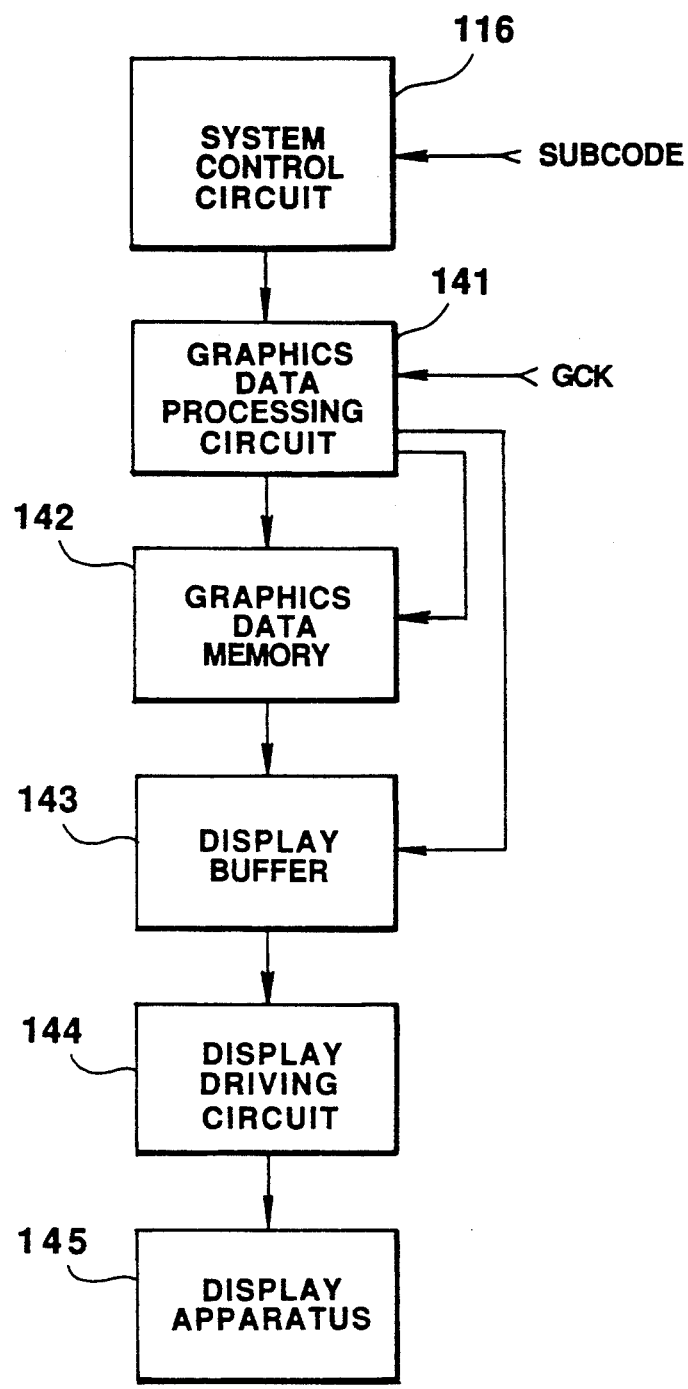
FIG. 24 is a fragmentary, block diagram showing an arrangement of the CD player unit according to the third embodiment of the present invention.

To be more concrete, as shown in FIG. 24, a graphics data processing circuit 141 is connected to the output side of the system control circuit 116. When supplied with the reproduced subcode through the system control circuit 116, the graphics data processing circuit 141 constructs the subcode in the form of the format shown in FIG. 22 and writes the font data involved in the subcode in a graphics data memory 142. The writing position (write address) of the font data is determined on the basis of location data (see FIG. 22). When the writing of font data of one picture screen in the graphics data memory 142 is finished, then the recorded content in the graphics data memory 142 is transferred to a display buffer 143.

A display driving circuit 144 converts the graphics data stored in the display buffer 143 into a display drive signal and supplies the display drive signal thus converted to a display apparatus 145 so that the display apparatus 145 displays an image.

A rest of the arrangements except the CD player unit 100 is substantially similar to that of the first embodiment.

OPERATION OF THE THIRD EMBODIMENT

Figure 25:
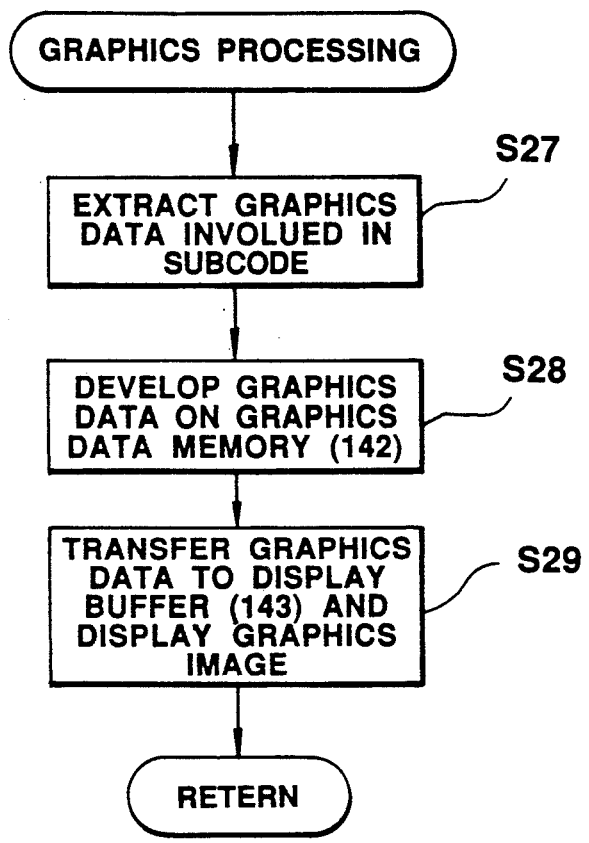
FIG. 25 is a flowchart to which reference will be made in explaining a graphics processing in the third embodiment of the present invention.

Operation of the third embodiment is fundamentally similar to those of the flowcharts forming FIGS. 9 and 10. However, since the graphics data is recorded in the subcode of the CD according to the third embodiment, audio data on the CD is reproduced and at the same time, still images are sequentially reproduced by the display apparatus 145. More specifically, as shown in a flowchart forming FIG. 25, when supplied with the subcode demodulated by the EFM-demodulating circuit 112, the system control circuit 116 detects the absolute time data from the Q data involved in the subcode and outputs the same as the absolute time data ABST. Also, the system control circuit 116 outputs the R to W data to the graphics data processing circuit 114. This graphics data processing circuit 114 is supplied with the clock signal GCK corresponding to the tempo setting data from the clock generating circuit 118 and the graphics data processing circuit 114 receives the R to W data in response to the clock signal GCK so that the R to W data are constructed in the form of the format shown in FIG. 22 in step S27. When the graphics data processing circuit 141 writes the font data involved in the R to W data in the graphics data memory 142 at step S28 and when the graphics data processing circuit 141 writes the font data of one picture screen in the graphics data memory 142, then the content stored in the graphics data memory 142 is transferred to the display buffer 143 and the graphics data is displayed by the display apparatus 145 via the display driving circuit 144 at step S29.

Since this graphics data processing is carried out in synchronism with the playback speed of the CD, during the CD synchronizing playback mode shown in FIG. 10, the playback speed of the audio data and of the image and the playback tempo of the automatic play are synchronized with one another.

While in the above-described embodiments of the present invention the player plays by the electronic keyboard musical instrument unit 200 in unison with the playback operation of the CD to thereby form the automatic playing data as described above, a variant is also possible where automatic playing data accompanying in unison with the playback of the CD is stored in a recording medium such as a read-only memory (ROM) card or the like.

Further, in FIG. 7, the rhythm signal and the auto base code signal output from the rhythm generating circuit 213 which generates auto rhythm or the automatic musical accompaniment unit 214 which generates the auto code under the control of the control unit 201 may be stored in the automatic playing memory 211 and the automatic play may be carried out.

Furthermore, the pitch changers, the automatic playing data and the musical sound generating method may be varied and modified without departing from the gist of the present invention.

While the player plays the electronic keyboard musical instrument in unison with the playback of the CD player as described above, the present invention is not limited thereto and a digital audio tape recorder (DAT), a compact cassette recorder, an LP record player and so on may be employed as the audio reproducing apparatus. In addition, the musical instrument is not limited to the electronic keyboard musical instrument and other musical instruments such as an electronic wind musical instrument, an electronic stringed musical instrument and so on may be employed.

Further, as described in the third embodiment, the image data may be recorded in the subcode of the CD and also may be recorded on the subcode of the DAT from a similar standpoint. Also, a digital (video cassette recorder) VCR can be utilized.

Furthermore, it is possible to utilize a variety of recording media such as a CD-ROM, a hard disc, a semiconductor memory of large storage capacity or the like in which both of audio and video data can be recorded. In this case, the present invention can be applied to the case such that a recording medium in which only one of audio and video data is recorded is reproduced.

Having described the preferred embodiments of the invention with reference to the accompanying drawings, it is to be understood that the invention is not limited to those precise embodiments and that various changes and modifications thereof could be effected by one skilled in the art without departing from the spirit or scope of the invention as defined in the appended claims.

What is claimed is:

1. An apparatus for carrying out a reproduction of performance data in synchronism with a reproduction of automatic playing data by using a recording medium in which performance data is recorded, comprising:
    reproducing means for driving said recording medium to reproduce said performance data;
    automatic playing data storing means for storing a series of automatic playing data which is reproduced in synchronism with said performance data stored in said recording medium;
    automatic playing means coupled to said automatic playing data storing means for reading said automatic playing data from said automatic playing data storing means to sequentially generate corresponding musical sound signals to thereby perform automatic play;
    speed data storing means for storing reproducing speed data used when said performance data and said automatic playing data are reproduced in synchronism with each other; and
    control means coupled to said reproducing means, to said automatic playing means and to said speed data storing means for controlling the reproduced condition of said performance data and said automatic playing data, and said control means including:
        means for controlling a driving speed of said recording medium so that said performance data is reproduced at a set speed corresponding to said speed data stored in said speed data storing means; and
        means for controlling a read-out speed of said automatic playing data from said automatic playing data storing means such that said automatic playing data is reproduced at a set speed corresponding to said speed data stored in said speed data storing means.

2. The apparatus according to claim 1, wherein:
    said performance data recorded in said recording medium is audio data; and
    said reproducing means drives said recording medium to reproduce said audio data so that said automatic playing data and said audio data are reproduced at a same reproducing speed in synchronism with each other under the control of said control means.

3. The apparatus according to claim 1, wherein:
said performance data recorded in said recording medium is audio data and image data; and
said reproducing means drives said recording medium to reproduce said audio data and said image data so that said automatic playing data, said audio data and said image data are reproduced at a same reproducing speed in synchronism with each other under the control of said control means.

4. The apparatus according to claim 1, wherein:
said performance data recorded in said recording medium is image data; and
said reproducing means drives said recording medium to reproduce said image data so that said automatic playing data and said image data are reproduced at a same reproducing speed in synchronism with each other under the control of said control means.

5. The apparatus according to claim 1, wherein:
said control means further includes clock generating means,
said clock generating means generates a clock signal used to determine a read-out speed of said automatic playing data from said automatic playing data storing means, and
a frequency of said clock signal is varied in response to said reproducing speed data stored in said speed data storing means.

6. The apparatus according to claim 1, wherein said speed data storing means stores input data inputted by the user as said reproducing speed data.

7. The apparatus according to claim 1, wherein said control means controls said reproducing means and said automatic playing means to selectively execute a first control operation for controlling the driving speed of said recording medium and a read-out speed of said automatic playing data from said automatic playing data storing means such that said performance data and said automatic playing data are reproduced at a same set speed in synchronism with each other corresponding to said reproducing speed data stored in said speed data storing means, and a second control operation for controlling the driving speed of said recording medium and the read-out speed of said automatic playing data from said automatic data storing means such that said performance data and said automatic playing data are reproduced at a predetermined normal speed in synchronism with each other.

8. The apparatus according to claim 1, wherein:
said performance data recorded in said recording medium is audio data,
said reproducing means drives said recording medium to reproduce said audio data,
a pitch of said reproduced audio data is changed in response to a reproducing speed,
said automatic playing means includes pitch varying means for varying a pitch of said musical sound signal, and
said control means controls said automatic playing means such that said automatic playing data and said audio data are reproduced at a same set speed in synchronism with each other, and said control means also controls said pitch varying means so that the pitch of said musical sound signal based on said automatic playing data is varied in response to the change of a pitch of said audio data.

9. The apparatus according to claim 1, wherein:
said performance data recorded in said recording medium is audio data,
said reproducing means includes pitch varying means for returning a reproducing pitch of said audio data to the original pitch by an amount changed in association with the reproducing speed, and
said control means controls said automatic playing means such that said automatic data and said audio data are reproduced at a same set speed in synchronism with each other.

10. An apparatus for carrying out a reproduction of performance data in synchronism with a reproduction of automatic playing data by using a recording medium in which performance data is recorded, comprising:
reproducing means for driving said recording medium to reproduce said performance data;
playing input means for carrying out a playing operation in unison with said performance data reproduced by said reproducing means to thereby output automatic playing data corresponding to the playing operation;
automatic playing data storing means for storing automatic playing data output from said playing input means;
automatic playing means coupled to said automatic playing data storing means for reading said automatic playing data from said automatic playing data storing means to sequentially generate corresponding musical sound signals to thereby perform automatic play;
speed data storing means for storing reproducing speed data used when said performance data and said automatic playing data are reproduced in synchronism with each other; and
control means coupled to said reproducing means, to said automatic playing means and to said speed data storing means for controlling the reproduced condition of said performance data and said automatic playing data, and said control means including:
means for controlling a driving speed of said recording medium so that said performance data is reproduced at a set speed corresponding to said speed data stored in said speed data storing means; and
means for controlling a read-out speed of said automatic playing data from said automatic playing data storing means such that said automatic playing data is reproduced at a set speed corresponding to said speed data stored in said speed data storing means.

11. The apparatus according to claim 10, wherein:
said performance data recorded in said recording medium is audio data; and
said reproducing means drives said recording medium to reproduce said audio data so that said automatic playing data and said audio data are reproduced at a same reproducing speed in synchronism with each other under the control of said control means.

12. The apparatus according to claim 10, wherein:
said performance data recorded in said recording medium is audio data and image data: and
said reproducing means drives said recording medium to reproduce said audio data and said image data so that said automatic playing data, said audio data and said image data are reproduced at a same reproducing speed in synchronism with each other under the control of said control means.

13. The apparatus according to claim 10, wherein:
said performance data recorded in said recording medium is image data: and
said reproducing means drives said recording medium to reproduce said image data so that said automatic playing data and said image data are reproduced at a same reproducing speed in synchronism with each other under the control of said control means.

14. The apparatus according to claim 10, wherein:
said control means further includes clock generating means, said clock generating means generates a clock signal used to determine a read-out speed of said automatic playing data from said automatic playing data storing means, and
a frequency of said clock signal is varied in response to the reproducing speed data stored in said speed data storing means.

15. The apparatus according to claim 10, wherein said speed data storing means stores input data inputted by the user as said reproducing speed data.

16. The apparatus according to claim 10, wherein said control means controls said reproducing means and said automatic playing means to selectively execute a first control operation for controlling the driving speed of said recording medium and a read-out speed of said automatic playing data from said automatic playing data storing means such that said performance data and said automatic playing data are reproduced at a same set speed in synchronism with each other corresponding to said reproducing speed data stored in said speed data storing means, and a second control operation for controlling the driving speed of said recording medium and the read-out speed of said automatic playing data from said automatic playing data storing means such that said performance data and said automatic playing data are reproduced at a predetermined normal speed in synchronism with each other.

17. The apparatus according to claim 10, wherein;
said performance data recorded in said recording medium is audio data,
said reproducing means drive said recording medium to reproduce said audio data,
a pitch of said reproduced audio data is changed in response to a reproducing speed,
said automatic playing means includes pitch varying means for varying a pitch of said musical sound signal, and
said control means controls said automatic playing means such that said automatic playing data and said audio data are reproduced at a same set speed in synchronism with each other, and said control means also controls said pitch varying means so that the pitch of said musical sound signal based on said automatic playing data is varied in response to the change of a pitch of said audio data.

18. The apparatus according to claim 10, wherein:
said performance data recorded in said recording medium is audio data,
said reproducing means includes pitch varying means for returning a reproducing pitch of said audio data to the original pitch by an amount changed in association with said reproducing speed, and said control means controls said automatic playing means such that said automatic playing data and said audio data are reproduced at a same set speed in synchronism with each other.

19. A reproducing method for carrying out a reproduction of performance data and a reproduction of automatic playing data in synchronism with each other by using a recording medium in which said performance data is recorded and an automatic playing data storing means in which said automatic playing data is stored, comprising the steps of:
storing reproducing speed data used when said performance data and said automatic playing data are reproduced in synchronism with each other;
controlling a playing speed of said recording medium such that said performance data is reproduced at a set reproducing speed corresponding to said stored reproducing speed data; and
a performance reproducing step which includes controlling a read-out speed of said automatic playing data from said automatic playing data storing means such that said automatic playing data is reproduced at a set reproducing speed corresponding to said stored reproducing speed data.

20. The reproducing method according to claim 19, wherein said performance data recorded in said recording medium comprises at least one of audio data and image data.

21. The reproducing method according to claim 19, wherein said reproducing speed data is input data input by the user as reproducing speed data.

22. The reproducing method according to claim 19, wherein: said performance data recorded in said recording medium is audio data,
the pitch of said audio data is changed in association with said set reproducing speed, and
said performance reproducing step includes varying a pitch of a musical sound signal based on said automatic playing data in response to the change of pitch of said audio data.

23. The reproducing method according to claim 19, wherein:
said performance data recording in said recording medium is audio data, and
the pitch of said audio data is changed in association with said set reproducing speed,
said performance reproducing step includes returning the pitch of reproduced audio data to the original pitch by an amount changed in response to said set reproducing speed.

24. A reproducing method for carrying out a reproduction of performance data and a reproduction of automatic playing data in synchronism with each other by using a recording medium in which said performance data is recorded and an automatic playing data storing means in which said automatic playing data is stored, comprising the steps of:
playing said recording medium to reproduce said performance data so that said automatic playing data is sequentially stored in said automatic playing data storing means by the playing operation of said recording medium in unison with the reproduction of said performance data;
storing reproducing speed data used when said performance data and said automatic playing data are reproduced in synchronism with each other;
controlling a playing speed of said recording medium such that said performance data is reproduced at a set reproducing speed corresponding to said stored reproducing speed data;

a performance reproducing step which includes controlling a read-out speed of said automatic playing data from said automatic playing data storing means such that said automatic playing data is reproduced at a set reproducing speed corresponding to said stored reproducing speed data.

25. The reproducing method according to claim 24, wherein said performance data recorded in said recording medium comprises at least one of audio data and image data.

26. The reproducing method according to claim 24, wherein said reproducing speed data is input data input by the user as reproducing speed data.

27. The reproducing method according to claim 24, wherein:

said automatic playing data is stored in said automatic playing data storing means and playing speed data of said recording medium is stored at a timing point in which said playing operation is carried out in said automatic playing data storing means, and said step of storing said reproducing speed data includes setting said playing speed data stored in said automatic playing data storing means as reproducing speed data to be used when said performance data and said automatic playing data are to be reproduced in synchronism with each other.

28. The reproducing method according to claim 24, wherein:

said performance data recorded in said recording medium is audio data, the pitch of said audio data is changed in association with said set of reproducing speed, and said performance reproducing step includes varying a pitch of a musical sound signal based on said automatic playing data in response to the change of the pitch of said audio data.

29. The reproducing method according to claim 24, wherein:

said performance data recorded in said recording medium is audio data, the pitch of said audio data is changed in association with said set reproducing speed, and said performance reproducing step includes returning the pitch of reproduced audio data to the original pitch by an amount changed in response to said set reproducing speed.

* * * * *